United States Patent
Hino et al.

(10) Patent No.: US 11,616,407 B2
(45) Date of Patent: Mar. 28, 2023

(54) SEGMENT-CORE COUPLED BODY AND METHOD OF MANUFACTURING ARMATURE

(71) Applicant: Mitsubishi Electric Corporation, Tokyo (JP)

(72) Inventors: Tatsuro Hino, Tokyo (JP); Akira Hashimoto, Tokyo (JP); Yutaka Hirota, Tokyo (JP); Masashi Nakamura, Tokyo (JP); Takatoshi Masuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 205 days.

(21) Appl. No.: 16/638,608

(22) PCT Filed: Aug. 22, 2018

(86) PCT No.: PCT/JP2018/031028
§ 371 (c)(1),
(2) Date: Feb. 12, 2020

(87) PCT Pub. No.: WO2019/039518
PCT Pub. Date: Feb. 28, 2019

(65) Prior Publication Data
US 2020/0251968 A1    Aug. 6, 2020

(30) Foreign Application Priority Data
Aug. 25, 2017   (JP) .............................. JP2017-162289

(51) Int. Cl.
*H02K 1/14* (2006.01)
*H02K 15/02* (2006.01)
(Continued)

(52) U.S. Cl.
CPC ............... *H02K 1/148* (2013.01); *H02K 1/06* (2013.01); *H02K 1/165* (2013.01); *H02K 15/024* (2013.01); *H02K 15/062* (2013.01); *H02K 15/10* (2013.01)

(58) Field of Classification Search
CPC .......... H02K 1/148; H02K 1/06; H02K 1/165; H02K 2201/09; H02K 15/024; H02K 15/062; H02K 15/10
(Continued)

(56) References Cited

U.S. PATENT DOCUMENTS 5,859,486 A * 1/1999 Nakahara ................ H02K 1/148
310/216.084
2002/0075121 A1  6/2002 Akita et al.
(Continued)

FOREIGN PATENT DOCUMENTS

JP   H0819196 A   1/1996
JP   H11220842 A  8/1999
(Continued)

OTHER PUBLICATIONS

Machine translation of JP-2010172130-A. (Year: 2010).*
(Continued)

*Primary Examiner* — Michael Andrews
(74) *Attorney, Agent, or Firm* — Buchanan Ingersoll & Rooney PC

(57) ABSTRACT

Provided is a segment-core coupled body, including a plurality of segment cores each including a core back and a tooth; and a plurality of coupling portions configured to couple the core backs to one another, wherein the plurality of segment cores and the plurality of coupling portions are each a laminated body of magnetic sheets, wherein the plurality of coupling portions each include: a posture holding portion adjacent to a gap defined between adjacent core (Continued)

backs; a first thin portion configured to couple one corner portion of the adjacent core backs and the posture holding portion; and a second thin portion configured to couple another corner portion of the adjacent core backs and the posture holding portion, and wherein, the posture holding portion projects toward a radially outer side with respect to the adjacent core backs.

26 Claims, 27 Drawing Sheets

(51) Int. Cl.
*H02K 1/06* (2006.01)
*H02K 15/06* (2006.01)
*H02K 15/10* (2006.01)
*H02K 1/16* (2006.01)

(58) Field of Classification Search
USPC ..... 310/216.007, 216.008, 216.009, 216.013
See application file for complete search history.

(56) References Cited

U.S. PATENT DOCUMENTS

| | | | | |
|---|---|---|---|---|
| 2010/0090560 | A1* | 4/2010 | Myojin | H02K 15/02 310/216.043 |
| 2013/0276297 | A1* | 10/2013 | Kurosaki | H02K 1/148 29/240.5 |
| 2015/0333577 | A1* | 11/2015 | Jang | H02K 1/148 29/596 |
| 2016/0256912 | A1 | 9/2016 | Ono et al. | |
| 2017/0288480 | A1 | 10/2017 | Murakami et al. | |

FOREIGN PATENT DOCUMENTS

| | | | | |
|---|---|---|---|---|
| JP | 2000201458 | A | | 7/2000 |
| JP | 2000324772 | A | | 11/2000 |
| JP | 2003189558 | A | | 7/2003 |
| JP | 2006288096 | A | | 10/2006 |
| JP | 3903784 | B2 | | 4/2007 |
| JP | 2007282498 | A | | 10/2007 |
| JP | 2010172130 | A * | 8/2010 | ............... H02K 1/18 |
| JP | 2014-230345 | A | | 12/2014 |
| JP | 2016163897 | A | | 9/2016 |
| JP | 2016171652 | A | | 9/2016 |
| WO | 2016113876 | A1 | | 7/2016 |

OTHER PUBLICATIONS

Office Action dated Jun. 1, 2021, issued in corresponding Japanese Patent Application No. 2019-537661, 6 pages including 3 pages of English translation.
International Search Report (PCT/ISA/210) dated Nov. 20, 2018, by the Japan Patent Office as the International Searching Authority for International Application No. PCT/JP2018/031028.
Written Opinion (PCT/ISA/237) dated Nov. 20, 2018, by the Japan Patent Office as the International Searching Authority for International Application No. PCT/JP2018/031028.
Office Action dated Nov. 10, 2020 issued in corresponding Japanese Patent Application No. 2019-537661, 19 pages including 10 pages of English translation.

* cited by examiner

COMPARATIVE EXAMPLE

COMPARATIVE EXAMPLE

COMPARATIVE EXAMPLE

SEGMENT-CORE COUPLED BODY AND METHOD OF MANUFACTURING ARMATURE

TECHNICAL FIELD

The present invention relates to a method of manufacturing an armature of a rotating electric machine such as an electric motor or a power generator, and to a segment-core coupled body.

BACKGROUND ART

In recent years, there has been a demand for a rotating electric machine such as an electric motor or a power generator with smaller size, higher output, and quietness. With regard to a rotating electric machine, it has been widely known that an armature core formed of a laminated core obtained by laminating magnetic sheets suppresses an eddy current generated in the armature core, thereby being capable of achieving a higher efficiency. Moreover, it has been widely known that an armature core having structure including a plurality of segments arranged in a circumferential direction improves a space factor of coils, thereby being capable of improving output. Further, it has also been widely known that, with the armature core having the structure including the plurality of segments arranged in the circumferential direction, the coils can easily be wound around the armature core. Thus, the productivity is improved. However, there has been a problem in that the armature core having the structure including the plurality of armature cores arranged in the circumferential direction causes an increase in the number of components of the magnetic sheets to be laminated, with the result that the productivity in a pressing step is degraded.

In a related-art method of manufacturing an armature core described in Patent Literature 1, a plurality of segments each formed of a tooth portion and a core back portion are stamped from magnetic sheets under a state in which respective core back portions of the plurality of segments are coupled to one another by thin coupling portions. With this, the number of components in the pressing step is reduced. Thus, the productivity in the pressing step is improved.

CITATION LIST

Patent Literature

[PTL 1] JP 2006-288096 A

SUMMARY OF INVENTION

Technical Problem

In the method of manufacturing an armature core described in Patent Literature 1, the coupling portions are each formed by stamping a slit portion formed between opposed circumferential side surfaces of the core back portions coupled to each other by the coupling portion. However, in order to stamp the slit portion, it has been required that a relief portion be provided to ensure the stiffness of a punch. There has been a problem in that providing the relief portion causes reduction in output of the rotating electric machine.

The present invention has been made to solve the problem described above, and has an object to obtain a segment-core coupled body having a relief portion in a pressing step smaller than that of a related art and being capable of suppressing reduction in output of a rotating electric machine and improving productivity, and a method of manufacturing an armature.

Solution to Problem

According to one embodiment of the present invention, there is provided a segment-core coupled body, including a plurality of segment cores each including a core back and a tooth; and a plurality of coupling portions configured to couple the core backs to one another, to thereby continuously and linearly arrange the plurality of segment cores, wherein the plurality of segment cores and the plurality of coupling portions are each a laminated body of magnetic sheets, wherein the plurality of coupling portions each include: a posture holding portion which is adjacent to a gap defined between adjacent core backs; a first thin portion configured to couple one corner portion of opposed corner portions of the adjacent core backs on an outer peripheral side and the posture holding portion; and a second thin portion configured to couple another corner portion of the opposed corner portions of the adjacent core backs on the outer peripheral side and the posture holding portion, and wherein, when viewed from a lamination direction of the laminated body, the posture holding portion projects toward a radially outer side with respect to the adjacent core backs.

Advantageous Effects of Invention

According to the present invention, a distance between core backs of adjacent segment cores can be increased. Thus, the relief portion provided at the time of stamping the coupling portions in the pressing step becomes smaller than that of the related art, thereby being capable of suppressing the reduction in output of the rotating electric machine and improving the productivity.

DESCRIPTION OF EMBODIMENTS

First Embodiment

Figure 1:
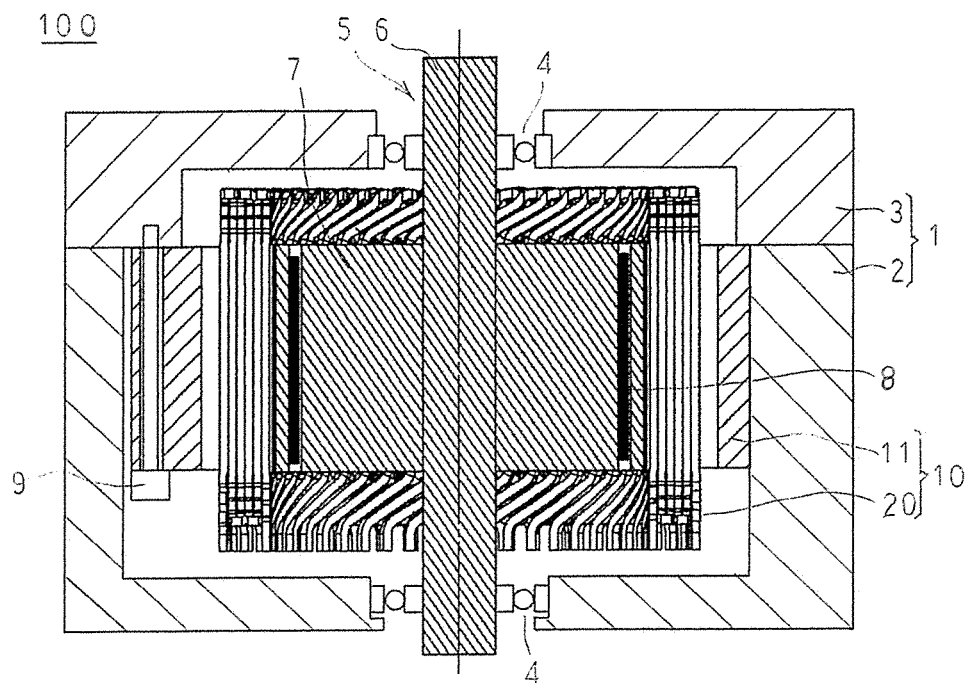
FIG. 1 is a sectional view for illustrating a rotating electric machine according to a first embodiment of the present invention.

FIG. 1 is a sectional view for illustrating a rotating electric machine according to a first embodiment of the present invention.

In FIG. 1, a rotating electric machine 100 includes a housing 1, an armature 10, a rotation shaft 6, and a rotor 5. The housing 1 includes a frame 2 having a bottomed cylindrical shape and a bracket 3 configured to close an opening portion of the frame 2. The armature 10 is fastened to the bracket 3 with bolts 9 and is received in a cylindrical portion of the frame 2. The rotation shaft 6 is rotatably supported at a bottom portion of the frame and at an axis center position of the bracket 3 through intermediation of bearings 4. The rotor 5 is fixed to the rotation shaft 6 and is rotatably arranged on an inner peripheral side of the armature 10.

The rotor 5 is a permanent magnet rotor including a rotor core 7 and a plurality of permanent magnets 8. The rotor core 7 is fixed to the rotation shaft 6 inserted therethrough at an axis center position thereof. The plurality of permanent magnets 8 are embedded on an outer peripheral surface side of the rotor core 7, are arranged, for example, at an equiangular pitch in a circumferential direction, to thereby form magnetic poles. The rotor 5 is not limited to the permanent magnet rotor, and there may be adopted a cage rotor or a winding rotor. In the cage rotor, rotor conductors which are not insulated are received in slots of a rotor core, and both sides of the cage rotor are short-circuited with short-circuit rings. In the winding rotor, conductor wires which are insulated are mounted to slots of a rotor core.

Figure 2:
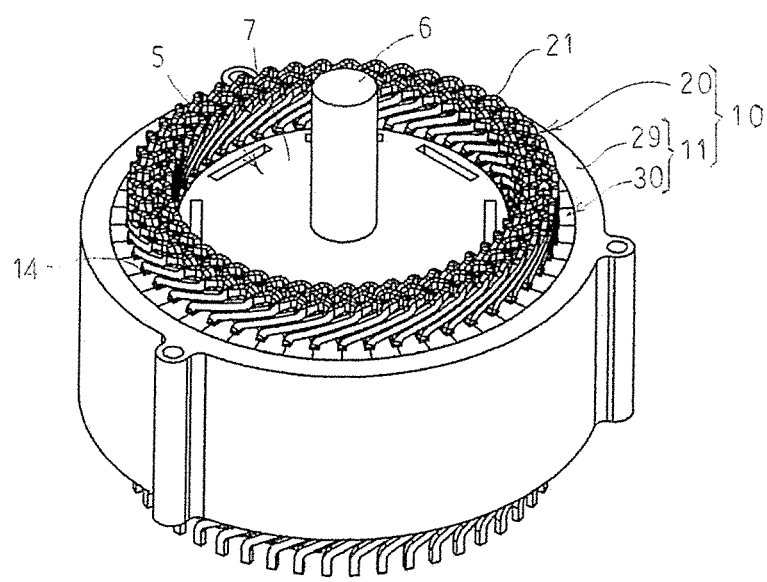
FIG. 2 is a perspective view for illustrating the rotating electric machine according to the first embodiment of the present invention.
Figure 3:
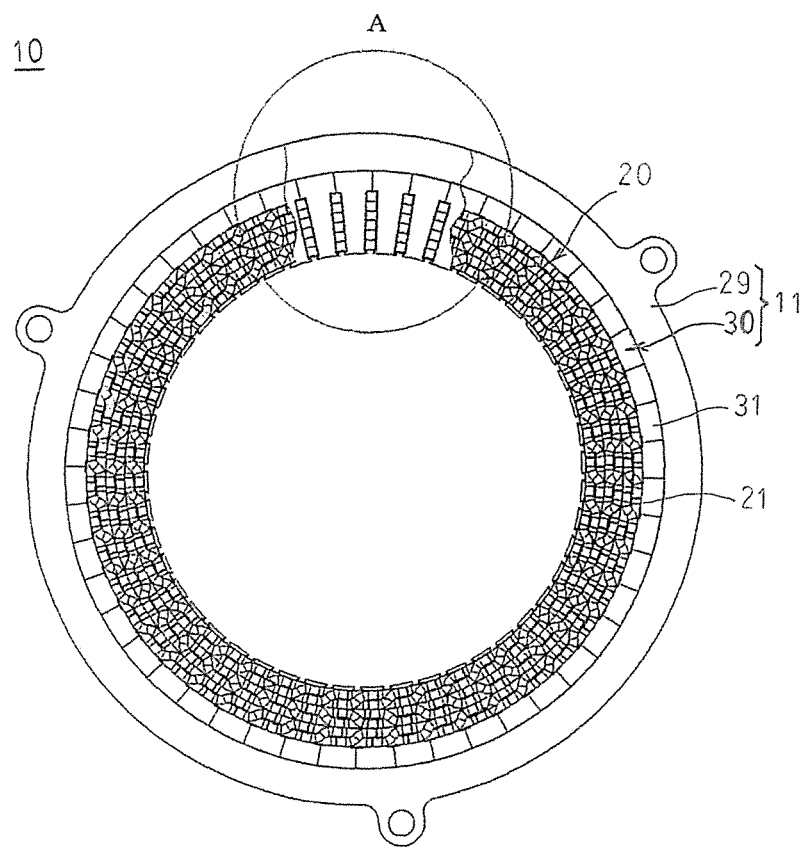
FIG. 3 is a partial breakaway end view for illustrating an armature according to the first embodiment of the present invention.
Figure 4:
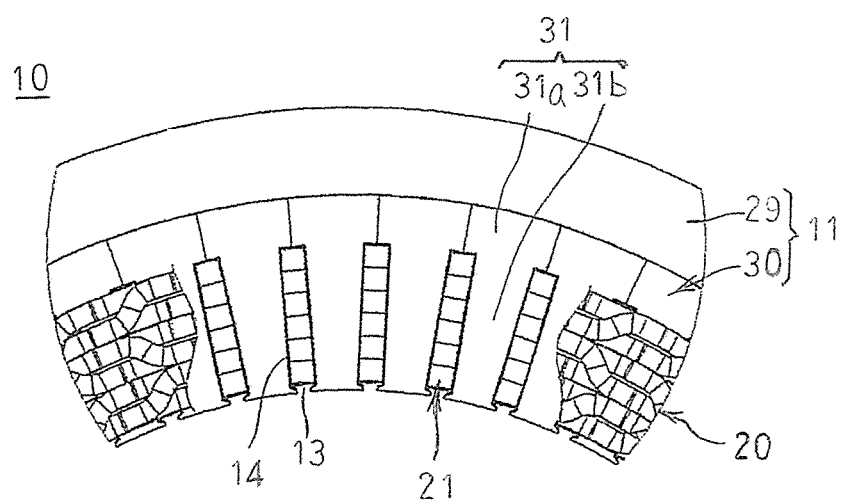
FIG. 4 is an enlarged view for illustrating the portion A of FIG. 3.
Figure 5:
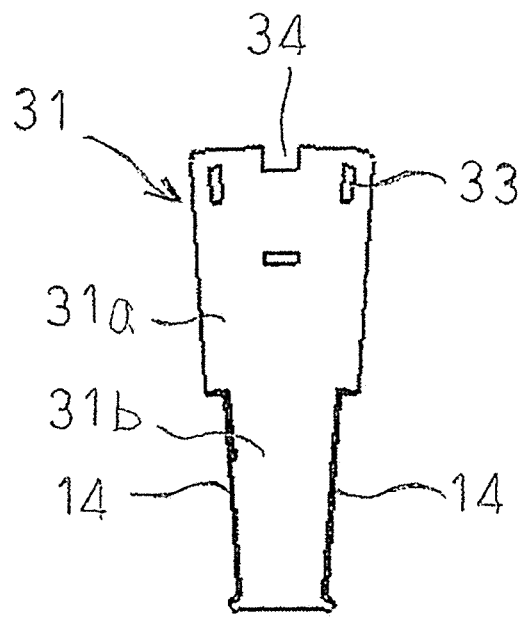
FIG. 5 is an end view for illustrating a segment core having insulating members mounted thereto in the armature according to the first embodiment of the present invention, as viewed from an axially outer side.
Figure 6:
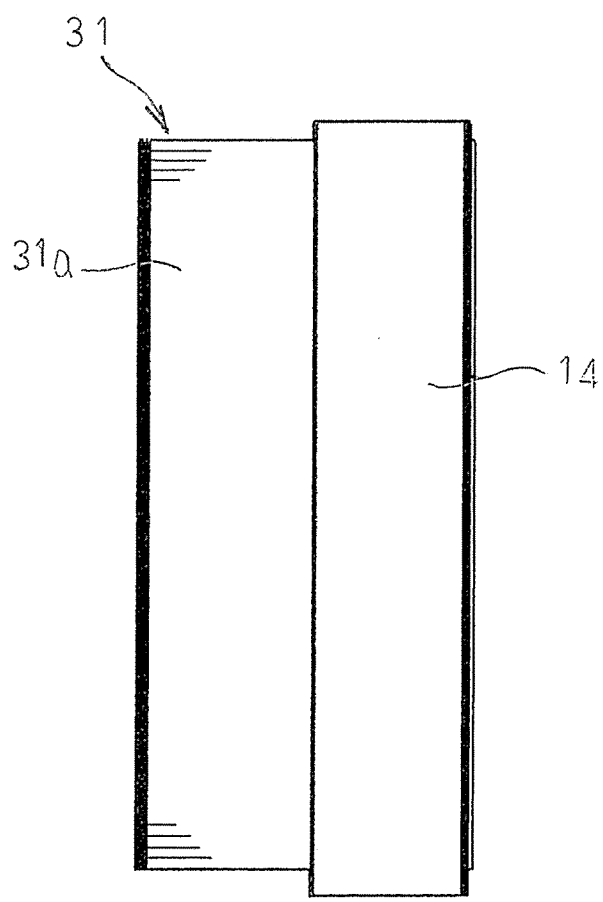
FIG. 6 is a side view for illustrating the segment core having the insulating members mounted thereto in the armature according to the first embodiment of the present invention.
Figure 7:
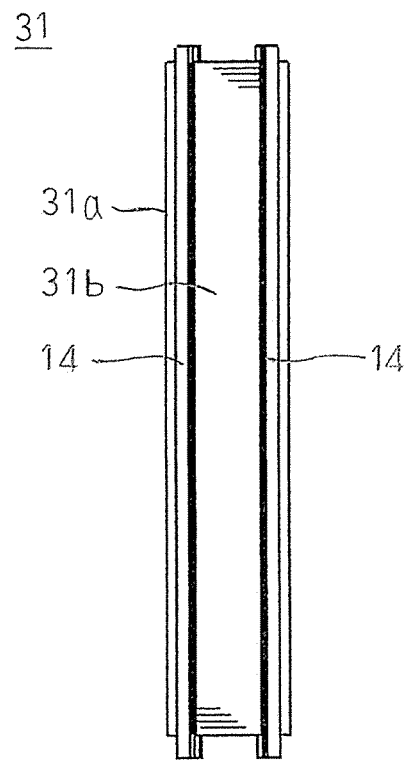
FIG. 7 is a front view for illustrating the segment core having the insulating members mounted thereto in the armature according to the first embodiment of the present invention, as viewed from a radially inner side.
Figure 8:
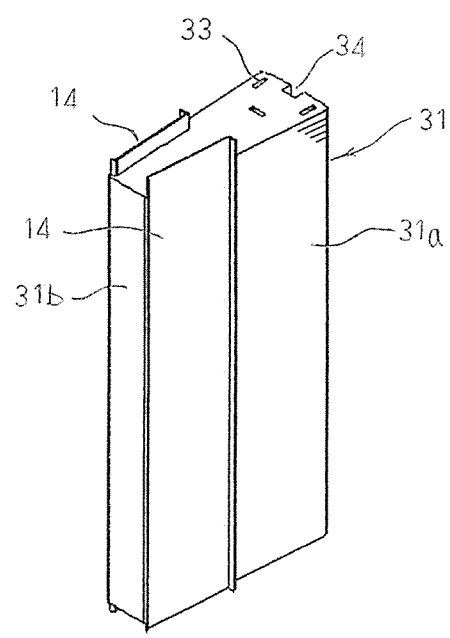
FIG. 8 is a perspective view for illustrating the segment core having the insulating members mounted thereto in the armature according to the first embodiment of the present invention.
Figure 9:
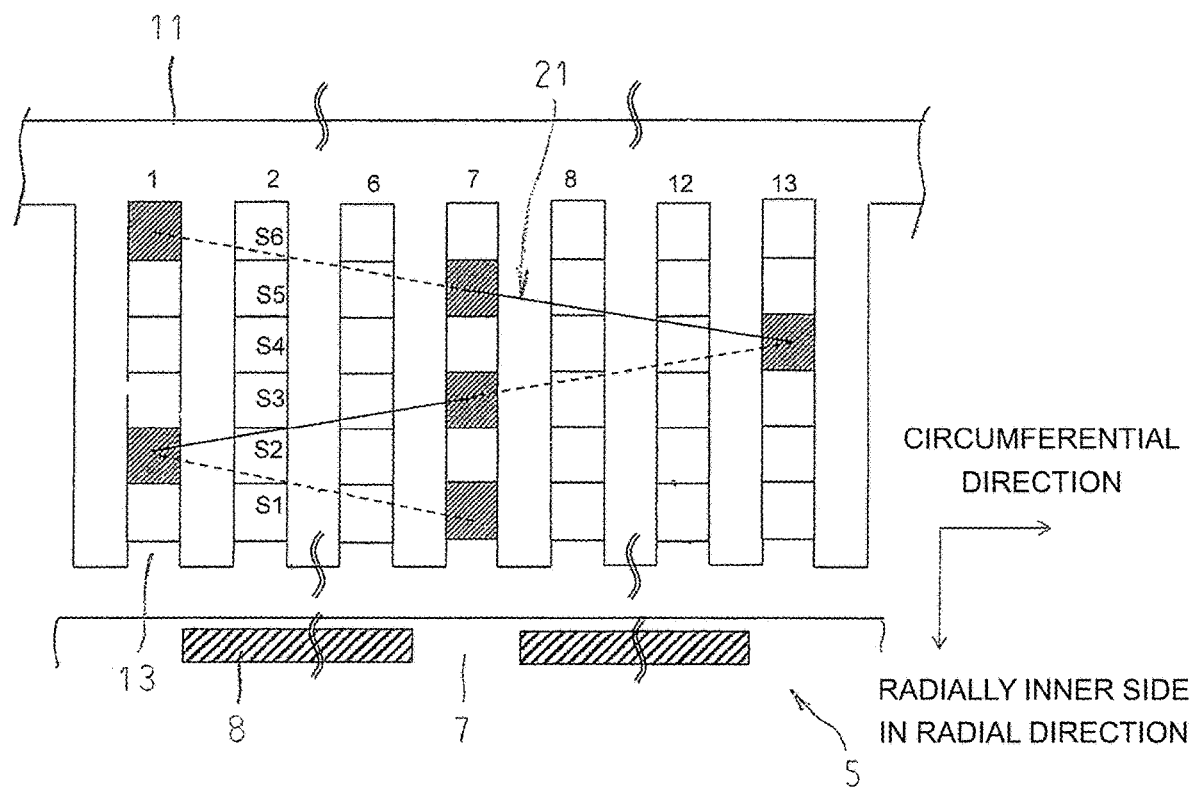
FIG. 9 is a schematic view for illustrating a mounting state of a coil forming an armature winding in the armature according to the first embodiment of the present invention.
Figure 10:
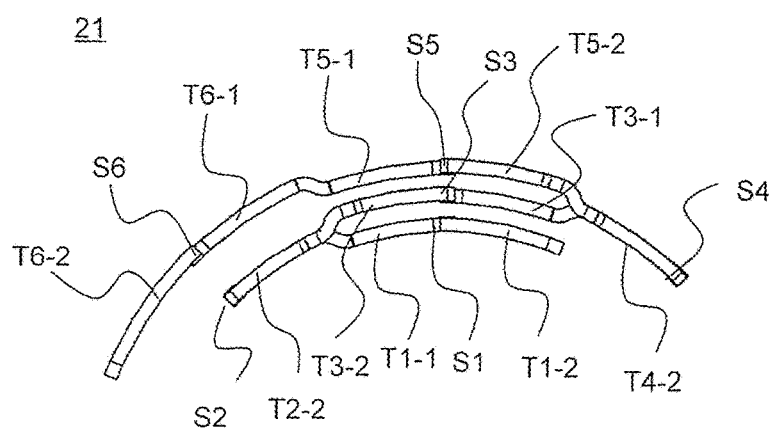
FIG. 10 is an end view for illustrating the coil forming the armature winding in the armature according to the first embodiment of the present invention, as viewed from the axially outer side.
Figure 11:
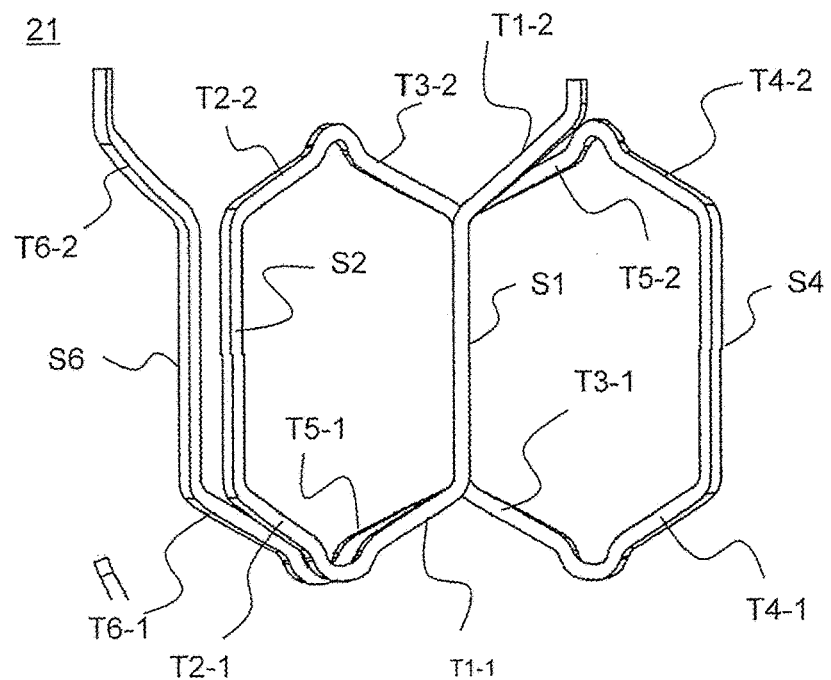
FIG. 11 is a front view for illustrating the coil forming the armature winding in the armature according to the first embodiment of the present invention, as viewed from the radially inner side.
Figure 12:
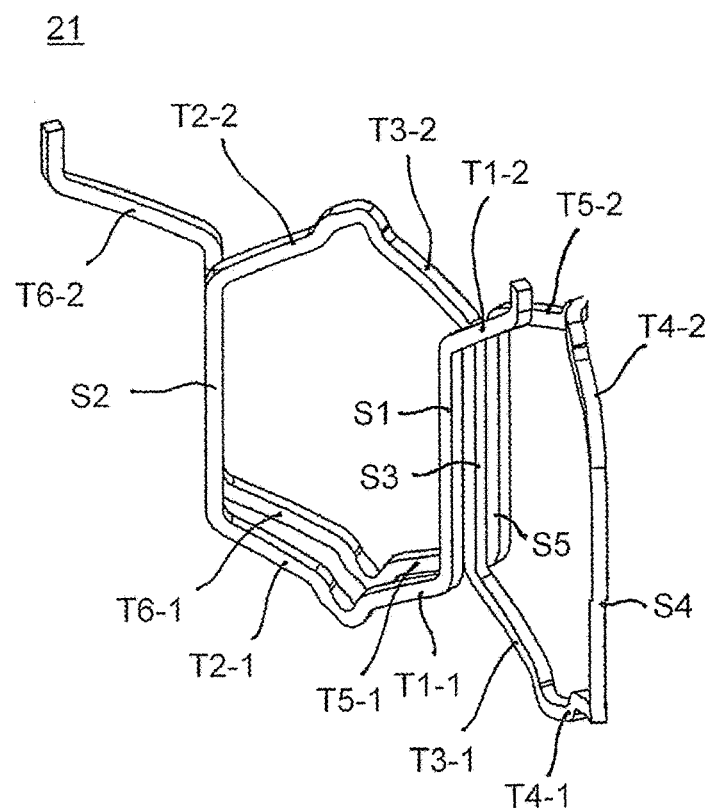
FIG. 12 is a perspective view for illustrating the coil forming the armature winding in the armature according to the first embodiment of the present invention.

Next, a configuration of the armature 10 is specifically described with reference to FIG. 2 to FIG. 12. FIG. 2 is a perspective view for illustrating the rotating electric machine according to the first embodiment of the present invention. FIG. 3 is a partial breakaway end view for illustrating the armature according to the first embodiment of the present invention. FIG. 4 is an enlarged view for illustrating the portion A of FIG. 3. FIG. 5 is an end view for illustrating a segment core having insulating members mounted thereto in the armature according to the first embodiment of the present invention, as viewed from an axially outer side. FIG. 6 is a side view for illustrating the segment core having the insulating members mounted thereto in the armature according to the first embodiment of the present invention. FIG. 7 is a front view for illustrating the segment core having the insulating members mounted thereto in the armature according to the first embodiment of the present invention, as viewed from a radially inner side. FIG. 8 is a perspective view for illustrating the segment core having the insulating members mounted thereto in the armature according to the first embodiment of the present invention. FIG. 9 is a schematic view for illustrating a mounting state of a coil forming an armature winding in the armature according to the first embodiment of the present invention. FIG. 10 is an end view for illustrating the coil forming the armature winding in the armature according to the first embodiment of the present invention. FIG. 11 is a front view for illustrating the coil forming the armature winding in the armature according to the first embodiment of the present invention, as viewed from the radially inner side. FIG. 12 is a perspective view for illustrating the coil forming the armature winding in the armature according to the first embodiment of the present invention. Further, in FIG. 2, for convenience, an illustration of the housing is omitted. Moreover, in FIG. 2 to FIG. 4, for convenience, illustrations of caulking portions and positioning grooves of the segment cores are omitted. Moreover, for convenience, a direction parallel to an axis center of the rotation shaft is referred to as "axial direction", a direction orthogonal to the center axis of the rotation shaft is referred to as "radial direction", and a direction of rotation about the rotation shaft is referred to as "circumferential direction". In FIG. 1, the up-and-down direction corresponds to the axial direction, and the right-and-left direction corresponds to the radial direction.

As illustrated in FIG. 2, the armature 10 includes an armature core 11, an armature winding 20 mounted to the armature core 11, and insulating members 14 configured to electrically isolate the armature winding 20 and the armature core 11 from each other. The armature winding 20 is formed of a plurality of coils 21. For convenience of description, the number of poles is set to 8, the number of slots of the armature core 11 is set to 48, and the armature winding 20 is set to three-phase winding. That is, the slots are formed in the armature core 11 such that two slots are provided for each pole and each phase.

As illustrated in FIG. 3 and FIG. 4, the armature core 11 includes an outer core 29 and an inner core 30. The outer core 29 has an annular shape. The inner core 30 is received on an inner peripheral side of the outer core 29. The inner core 30 includes forty-eight segment cores 31. The segment core 31 is produced by laminating a set number of T-shaped core pieces having been stamped from magnetic sheets such as electromagnetic steel sheets. The segment core 31 includes a core back 31a, a tooth 31b, caulking portions 33, and a positioning groove 34. The core back 31a has an arc shape. The tooth 31b projects from a circumferential center portion of an inner peripheral wall surface of the core back 31a toward a radially inner side. The caulking portions 33 are configured to fix the core back 31a by caulking. The positioning groove 34 has a groove direction extending in the axial direction, and is formed in an outer peripheral surface of the core back 31a so as to extend from one end to another end of the segment core 31 in the axial direction. The forty-eight segment cores 31 are annularly arranged with side surfaces of the core backs 31a being held in abutment against one another, and are received and held in the outer core 29 by press-fitting or shrink fitting. The forty-eight segment cores 31 are annularly arranged to form the inner core 30. A region surrounded by the core backs 31a and the teeth 31b adjacent to each other in the circumferential direction define a slot 13. The insulating members 14 are received in the slot 13, to thereby electrically insulate the coils 21 and the inner core 30, that is, the coils 21 and the armature core 11.

The outer core 29 is produced by laminating a set number of magnetic sheets having been stamped into a ring shape. However, the outer core 29 may be produced in a ring shape with a bulk body made of a magnetic material. It is only required that the outer core 29 be capable of fixing and holding at least the inner core 30. Thus, a material of the outer core 29 is not limited to the magnetic material, and the outer core 29 may be produced with use of a non-magnetic material such as aluminum.

The insulating member 14 is formed with use of a rectangular sheet material having a length longer than an axial length of the tooth 31b and having a width wider than a radial width of a side surface of the tooth 31b oriented in the circumferential direction. The insulating member 14 is produced in a U-shape by bending both edges of the rectangular sheet material in the width direction toward the same direction. As a material of the insulating member 14, there is used a material such as polyimide (PI), polyethylene terephthalate (PET), or polyphenylene sulfide, which have an excellent electric insulation property and an excellent thermal conductivity.

As illustrated in FIG. 5 to FIG. 8, the insulating members 14 are bonded, with use of an adhesive, to surfaces of the tooth 31b oriented outward in the circumferential direction and surfaces of the core back 31a oriented inward in the radial direction. With this, the insulating members 14 are installed at both side portions of the tooth 31b in the circumferential direction in a state of projecting from the tooth 31b toward both sides in the axial direction.

The armature winding 20 is formed of the forty-eight coils 21. As illustrated in FIG. 11, the coil 21 is a distributed winding coil obtained by forming a conductor wire, which is formed of a copper wire or an aluminum wire, or the like being insulation-coated with an enamel resin and being continuous without any connection portion, wound into a shape of "8" as viewed from the radial direction. As illustrated in FIG. 10 to FIG. 12, the coil 21 is formed of slot portions S1 to S6 to be received in the slots 13 and turn portions T1-1 to 6-1 and T1-2 to T6-2 coupling the slot portions S1 to S6, which are to be received in different slots 13, on an outer side of the slots 13.

Now, with reference to FIG. 9, a configuration of the coil 21 is specifically described. In FIG. 9, the numbers 1, 2, 6, 7, 8, 12, and 13 are numbers which are allocated to the slots 13 in the arrangement order in the circumferential direction, and radial positions of the six slot portions S1 to S6 received in the slots 13 are defined as a first layer, a second layer, . . . and a sixth layer from the radially inner side.

The slot portions S1 to S6 of the coil 21 are received as follows. The slot portion S1 is received in the first layer of the slot 13 of No. 7. The slot portion S2 is received in the second layer of the slot 13 of No. 1. The slot portion S3 is received in the third layer of the slot 13 of No. 7. The slot portion S3 is received in the fourth layer of the slot 13 of No. 13. The slot portion S5 is received in the fifth layer of the slot 13 of No. 7. The slot portion S6 is received in the sixth layer of the slot 13 of No. 1. The slot portions S1 and S2 are coupled to each other by the turn portions T1-1 and T2-1 on another end side of the armature core 11 in the axial direction. The slot portions S2 and S3 are coupled to each other by the turn portions T2-2 and T3-2 on one end side of the armature core 11 in the axial direction. The slot portions S3 and S4 are coupled to each other by the turn portions T3-1 and T4-1 on the another end side of the armature core 11 in the axial direction. The slot portions S4 and S5 are coupled to each other by the turn portions T4-2 and T5-2 on the one end side of the armature core 11 in the axial direction. The slot portions S5 and S6 are coupled to each other by the turn portions T5-1 and T6-1 on the another end side of the armature core 11 in the axial direction. The turn portion T1-2 projects from the slot portion S1 toward the one end side of the armature core 11 in the axial direction. Further, the turn portion T6-2 projects from the slot portion S6 toward the one end side of the armature core 11 in the axial direction.

As described above, the slot portions included in each of the pairs of the slot portions S1 to S6 of the coil 21 are received in a pair of slots 13 apart from each other by six slots in the circumferential direction. In the first embodiment, the six slots correspond to one magnetic pole pitch. The coils 21 are arranged at one-slot pitch in the circumferential direction. With this, in each of the slots 13, six slots corresponding to slot portions S1 to S6 of three different coils 21 are orderly arranged in one row in the radial direction. Turn portions T1-2 and T6-2 of one coil 21 are connected to turn portions T1-2 and T6-2 of another coil 21, a neutral point, or a power feeding portion.

Figure 13:
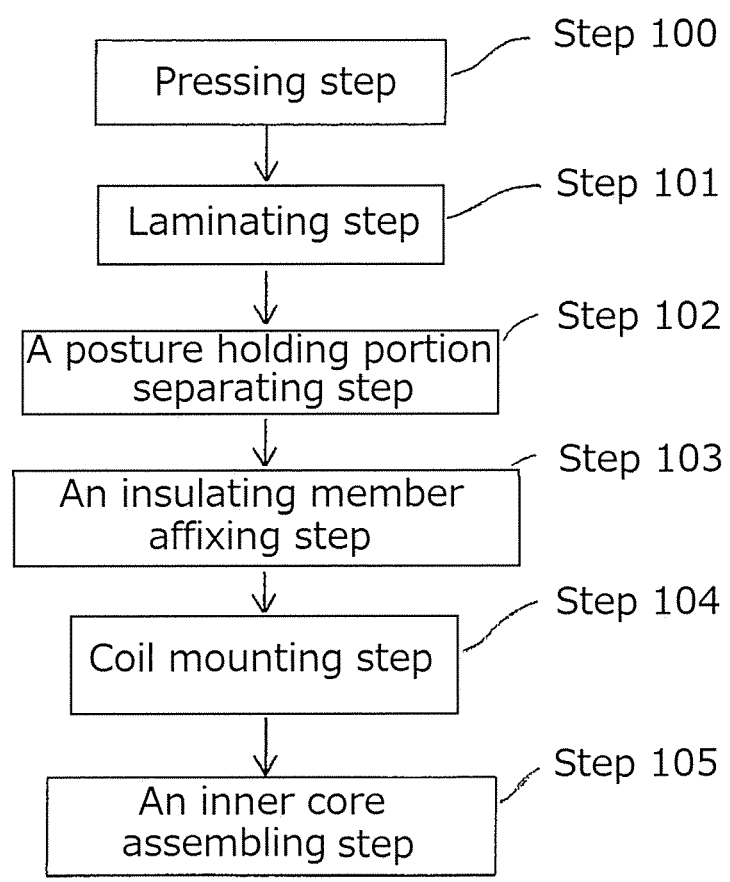
FIG. 13 is a flowchart for illustrating a method of manufacturing an armature according to the first embodiment of the present invention.
Figure 14:
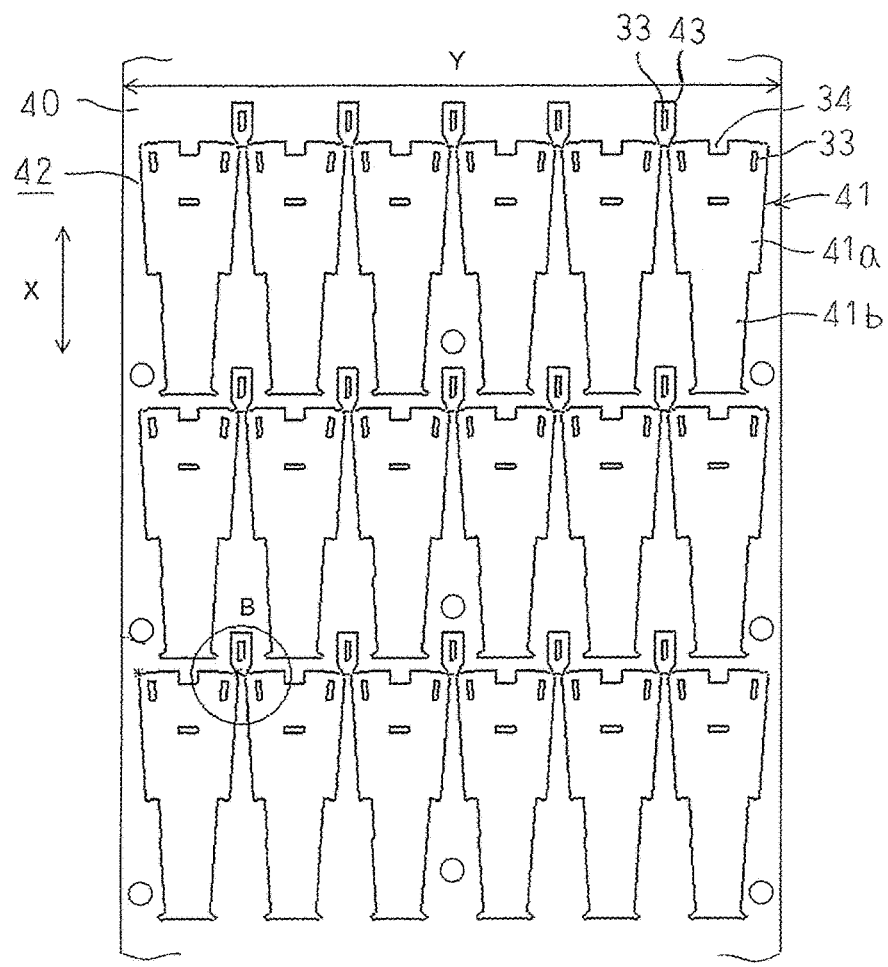
FIG. 14 is a plan view for illustrating arrangement of material cutting in a pressing step of the method of manufacturing an armature according to the first embodiment of the present invention.
Figure 15:
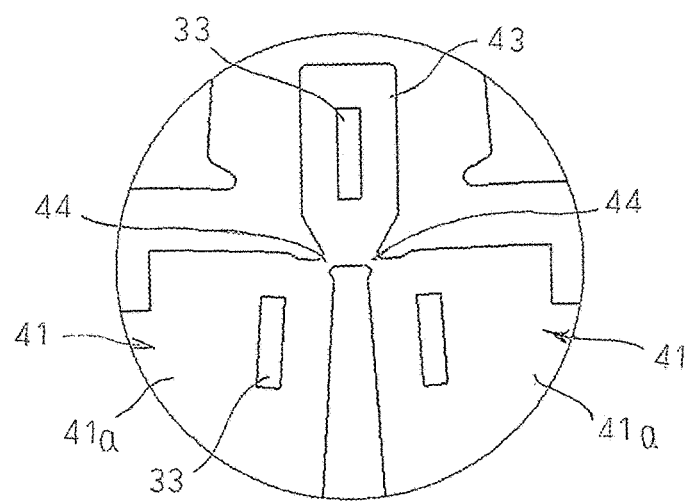
FIG. 15 is an enlarged view for illustrating the portion B of FIG. 14.
Figure 16:
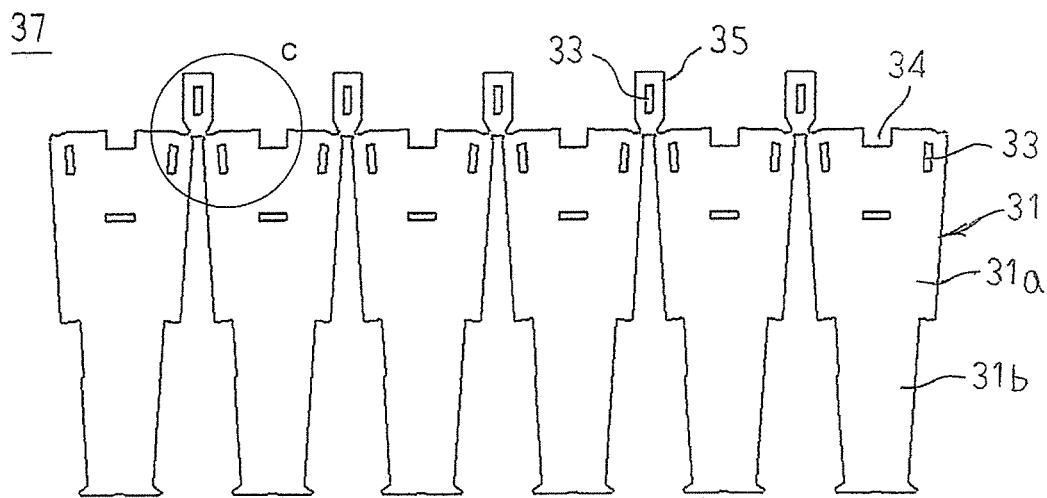
FIG. 16 is a plan view for illustrating a segment-core coupled body in the armature according to the first embodiment of the present invention.
Figure 17:
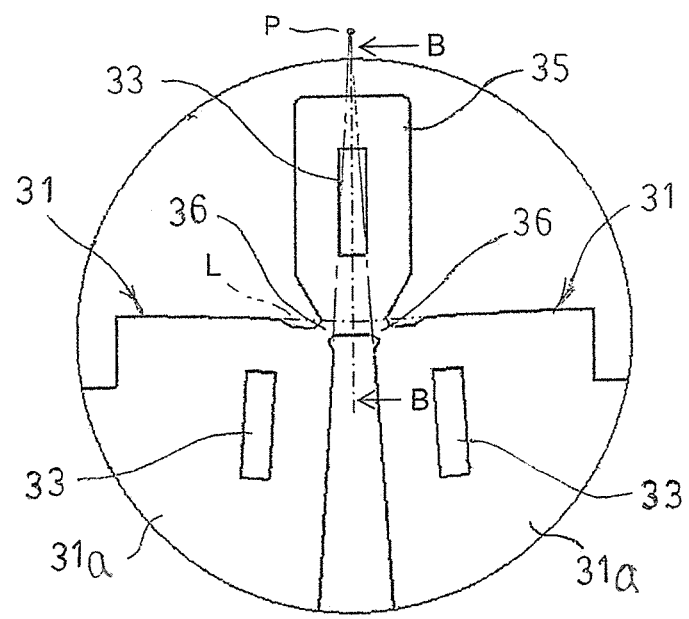
FIG. 17 is an enlarged view for illustrating the portion C of FIG. 16.
Figure 18:
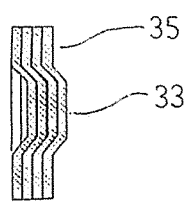
FIG. 18 is a sectional view taken along the line B-B of FIG. 17, as viewed from the direction indicated by the arrows.
Figure 19:
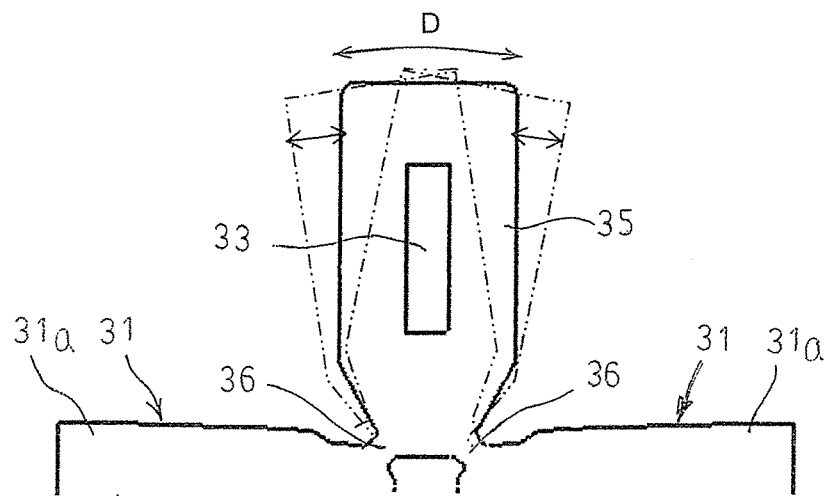
FIG. 19 is a view for illustrating a posture holding portion separating step of the method of manufacturing an armature according to the first embodiment of the present invention.
Figure 20:
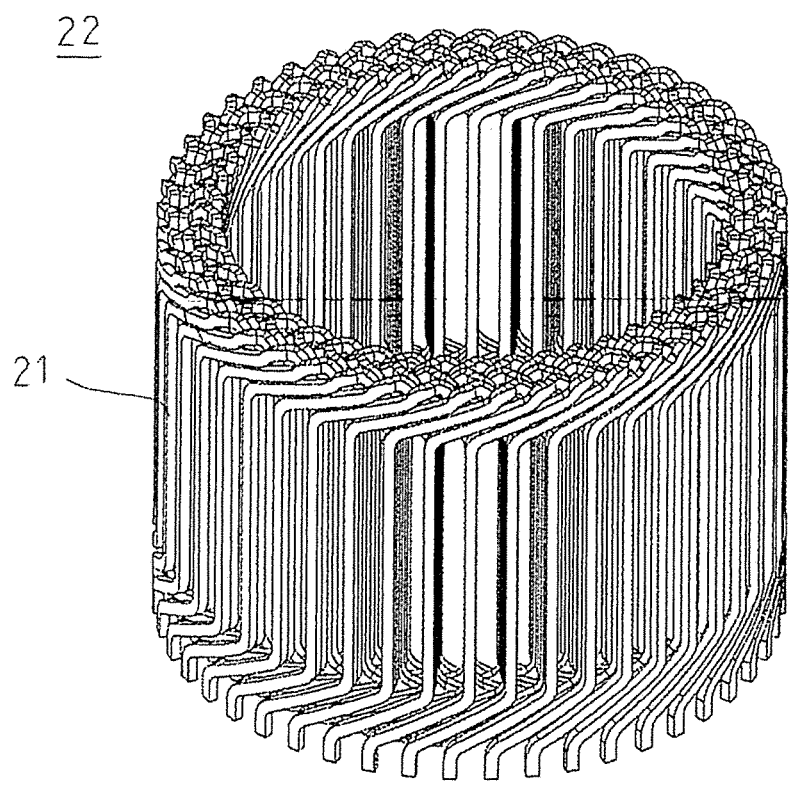
FIG. 20 is a perspective view for illustrating a winding assembly in the method of manufacturing an armature according to the first embodiment of the present invention.
Figure 21:
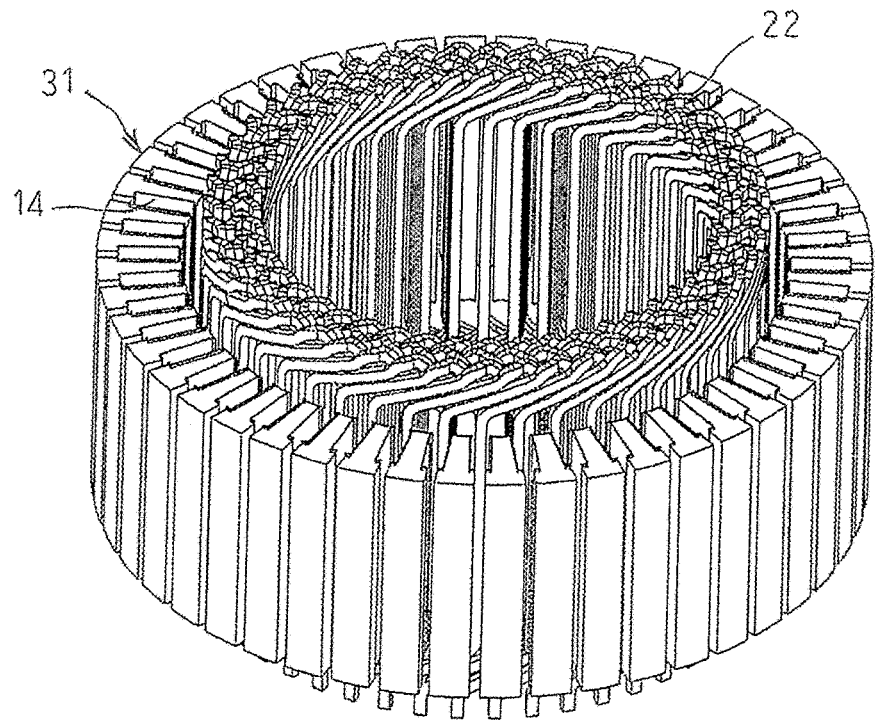
FIG. 21 is a perspective view for illustrating a coil mounting step of the method of manufacturing an armature according to the first embodiment of the present invention.
Figure 22:
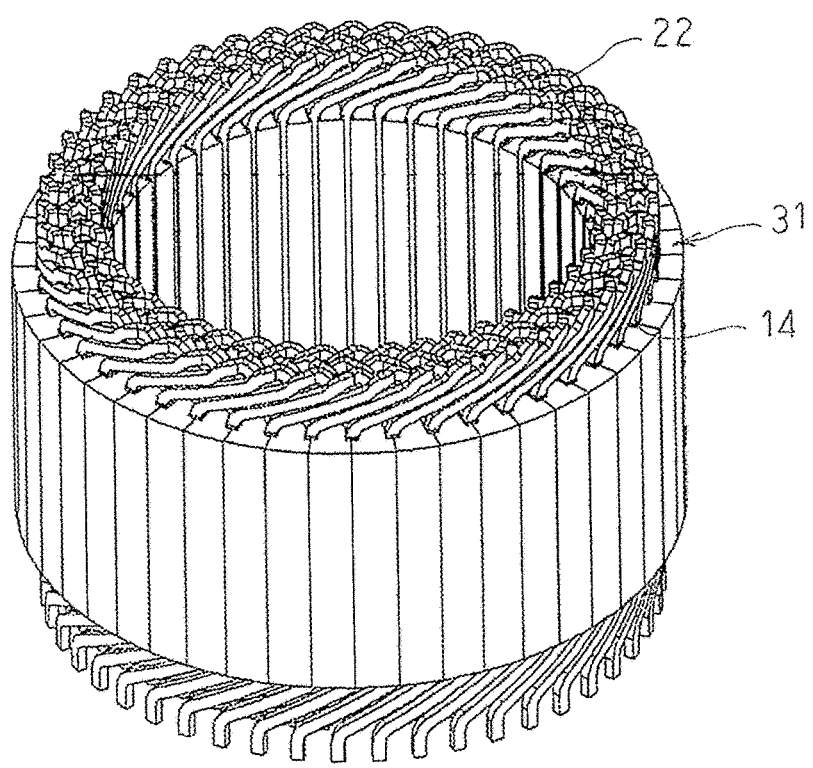
FIG. 22 is a perspective view for illustrating a state in which coils are mounted to an inner peripheral core in the method of manufacturing an armature according to the first embodiment of the present invention.
Figure 23:
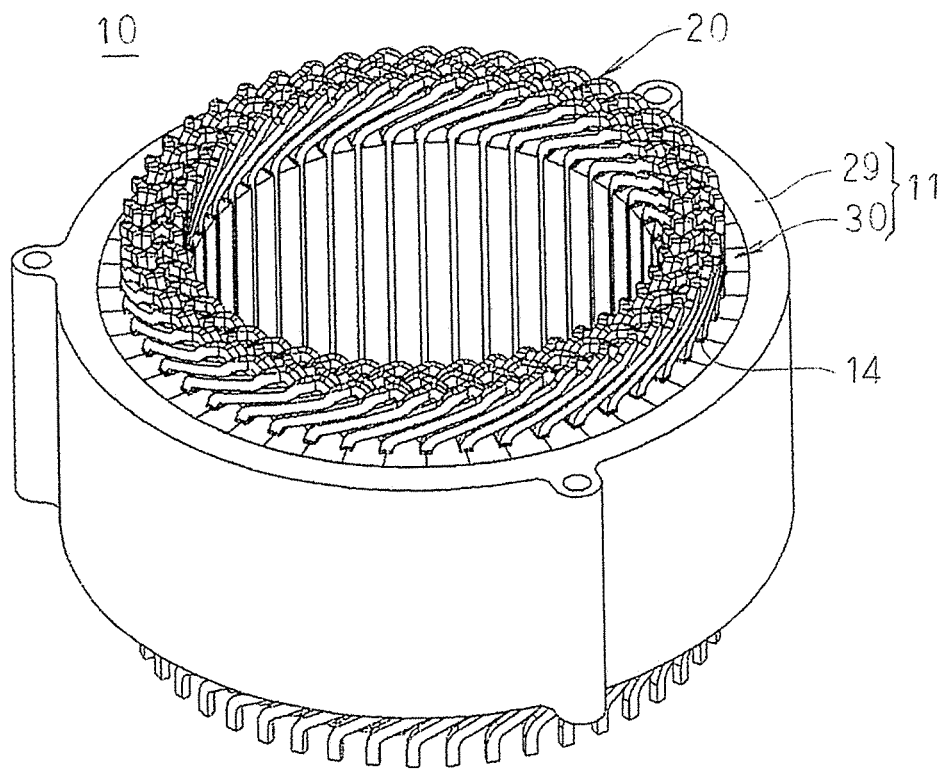
FIG. 23 is a perspective view for illustrating a state in which the inner peripheral core having the coils mounted thereto is mounted to an outer peripheral core in the method of manufacturing an armature according to the first embodiment of the present invention.

Next, a method of manufacturing the armature 10 is described with reference to FIG. 13 to FIG. 23. FIG. 13 is a flowchart for illustrating a method of manufacturing an armature according to the first embodiment of the present invention. FIG. 14 is a plan view for illustrating arrangement of material cutting in a pressing step of the method of manufacturing an armature according to the first embodiment of the present invention. FIG. 15 is an enlarged view for illustrating the portion B of FIG. 14. FIG. 16 is a plan view for illustrating a segment-core coupled body in the armature according to the first embodiment of the present invention. FIG. 17 is an enlarged view for illustrating the portion C of FIG. 16. FIG. 18 is a sectional view taken along the line B-B of FIG. 17, as viewed from the direction indicated by the arrows. FIG. 19 is a view for illustrating a posture holding portion separating step of the method of manufacturing an armature according to the first embodiment of the present invention. FIG. 20 is a perspective view for illustrating a winding assembly in the method of manufacturing an armature according to the first embodiment of the present invention. FIG. 21 is a perspective view for illustrating a coil mounting step of the method of manufacturing an armature according to the first embodiment of the present invention. FIG. 22 is a perspective view for illustrating a state in which the coils are mounted to an inner peripheral core in the method of manufacturing an armature according to the first embodiment of the present invention. FIG. 23 is a perspective view for illustrating a state in which the inner peripheral core having the coils mounted thereto is mounted to an outer peripheral core in the method of manufacturing an armature according to the first embodiment of the present invention.

First, in a pressing step 100, a core-piece coupled body 42 is stamped from an elongated belt-like body 40 formed of a magnetic sheet. As illustrated in FIG. 14, a core piece 41 includes a core back portion 41a, a tooth portion 41b, caulking portions 33, and a positioning groove 34. The core back portion 41a has an arc shape. The tooth portion 41b projects from a center position of an inner peripheral wall surface of the core back portion 41a in the circumferential direction toward the radially inner side. The caulking portions 33 are formed in the core back portion 41a and serve as first fixing members. The positioning groove 34 is a recess formed at a center portion of an outer peripheral surface of the core back portion 41a in the circumferential direction. As illustrated in FIG. 15, a posture holding piece 43 is coupled to an intersecting portion between an outer peripheral surface of the core back portion 41a of one core piece 41 and a side surface of the one core piece 41 on one side in the circumferential direction, that is, a corner portion of the core back portion 41a on one side in the circumferential direction on an outer peripheral side with use of one thin piece 44.

Moreover, the posture holding piece 43 is coupled to an intersecting portion between an outer peripheral surface of the core back portion 41a of another core piece 41 and a side surface of the another core piece 41 on another side in the circumferential direction, that is, a corner portion of the core back portion 41a on another side in the circumferential direction on the outer peripheral side with use of another thin piece 44. With this, the posture holding piece 43 is arranged so as to be adjacent to a gap defined between adjacent core back portions 41a. With this, as illustrated in FIG. 14, six core pieces 41 are coupled to one another in a series, thereby forming the linear core-piece coupled body 42. The caulking portion 33 is formed also in the posture holding piece 43. The posture holding piece 43 and the thin pieces 44 serve as coupling pieces configured to couple the core back portions 41a to each other.

In the pressing step 100, as illustrated in FIG. 14, the core-piece coupled body 42 is stamped at a constant pitch with a length direction of the tooth portion 41b being matched with a delivery direction X of the elongated belt-like body 40 and an arrangement direction of the core pieces 41 being a width direction Y of the elongated belt-like body 40. On this occasion, the core-piece coupled body 42 is stamped so that the posture holding pieces 43 thereof are each located between tooth portions 41b of the core-piece coupled body 42 having been previously stamped.

Ina laminating step 101, the core-piece coupled bodies 42 having been stamped from the elongated belt-like body 40 are sequentially laminated in a die on core-piece coupled bodies 42 having been previously stamped. In the course of laminating the core-piece coupled bodies 42, the caulking portions 33 are fitted to one another so that the core back portions 41a are fixed to one another, thereby fixing the posture holding pieces 43 to one another.

A set number of core-piece coupled bodies 42 are laminated to form a segment-core coupled body 37. In this case, the core back portions 41a are laminated to form the core back 31a. The tooth portions 41b are laminated to form the tooth 31b. The posture holding pieces 43 are laminated to form a posture holding portion 35 having a columnar shape. The thin pieces 44 are laminated to form a thin portion 36. As described above, the core pieces 41 are laminated to form the segment core 31. With this, as illustrated in FIG. 16 and FIG. 17, six segment cores 31 are linearly coupled to one another in series, and the segment-core coupled body 37 is manufactured. The posture holding portion 35 and the thin portions 36 serve as coupling portions configured to couple the core backs 31a to each other.

The caulking portions 33 are produced by subjecting the elongated belt-like body 40 to extrusion in the pressing step 100. As illustrated in FIG. 18, the caulking portions 33 are extruded beyond a plate thickness of the elongated belt-like body 40. On this occasion, the caulking portions 33 are each in a state of being cut along long sides of a rectangle and being continuous to the posture holding piece 43 on short sides of the rectangle. In this case, the caulking portions 33 are extruded beyond the plate thickness. However, in general, it is only required that the caulking portions 33 be extruded by about 60% of the plate thickness. Moreover, the caulking portion 33 formed in the core back portion 41a also has a similar configuration.

Next, the segment-core coupled body 37 having been integrated under the state in which a set number of core-piece coupled bodies 42 are laminated is taken out from the die. Next, in a posture holding portion separating step 102, the posture holding portions 35 are separated from the segment-core coupled body 37, to thereby produce the segment cores 31. On this occasion, an external force is applied to the posture holding portion 35 so that the posture holding portion 35 reciprocatingly moves in the right-and-left direction in a plane of the core piece as indicated by the arrows D in FIG. 19. Accordingly, the thin portions 36 are cut, and the posture holding portion 35 is separated. The thin portions 36 may be cut by reciprocatingly moving the segment core 31 relative to the posture holding portion 35.

Next, in an insulating member affixing step 103, the insulating members 14 are affixed to the segment core 31 with use of an adhesive. With this, as illustrated in FIG. 5 to FIG. 8, the segment core 31 having the insulating members 14 assembled to both side portions of the tooth 31b in the circumferential direction can be obtained.

Next, the forty-eight coils 21 are annularly arranged at one-slot pitch, to thereby assemble an winding assembly 22 having a cage-like shape as illustrated in FIG. 20. In the winding assembly 22 having been assembled in such a manner, forty-eight slot-portion rows each including six slot portions S1 to S6 arranged in a row in the radial direction are arranged at one-slot pitch in the circumferential direction.

Next, as illustrated in FIG. 21, the forty-eight segment cores 31 each having the insulating members 14 mounted thereto are annularly arranged on an outer peripheral side of the winding assembly 22. The tooth 31b of each of the segment cores 31 is oriented toward the radially inner side and is located in a space defined on respective radially outer sides of adjacent slot-portion rows. At this time, a diameter of the winding assembly is increased, and hence the space between the adjacent slot-portion rows is widened.

Next, the forty-eight segment cores 31 are simultaneously moved toward the radially inner side so that the teeth 31b are each inserted between adjacent slot-portion rows. With the movement of the segment cores 31 toward the radially inner side, the diameter of the winding assembly 22 is reduced. Then, side surfaces of the core backs 31a of the segment core 31 are held in abutment against one another so that the segment cores 31 are mounted to the winding assembly 22 as illustrated in FIG. 22. Side surfaces of the core backs 31a of the forty-eight segment cores 31 in the circumferential direction are brought into abutment against one another, thereby forming the inner core 30 having an annular shape. With this coil mounting step 104, the winding assembly 22 is mounted to the inner core 30. Next, in an inner core assembling step 105, the inner core 30 having the winding assembly 22 mounted thereto is inserted into the outer core 29 through press-fitting or shrink-fitting. With this, as illustrated in FIG. 23, the inner core 30 is held in the outer core 29 in a fixed state.

Next, turn portions T1-2 and T6-2 of one coil 21 are connected to turn portions T1-2 and T6-2 of another coil 21, a neutral point, or a power feeding portion by joining means such as welding, thereby forming the armature winding 20. With this, the armature 10 is assembled.

According to the first embodiment, the posture holding portions 35 are coupled to the core backs 31a of the segment cores 31. The posture holding portions 35 are integrated under the state in which the posture holding pieces 43 are laminated. With this, the stiffness of the segment-core coupled body 37 is increased, and the segment-core coupled body 37 can easily be handled.

Further, the core-piece coupled body 42 is stamped at a constant pitch with an arrangement direction of the core piece 41 being matched with a width direction Y of the elongated belt-like body 40. On this occasion, the core-piece coupled body 42 is stamped so that the posture holding pieces 43 thereof are each located between tooth portions 41b of the core-piece coupled body 42 having been previously stamped. With this, a stamping pitch of the core-piece coupled bodies 42 is reduced. Thus, a material yield is improved. Moreover, degradation in material yield caused by forming the posture holding pieces 43 is suppressed.

Figure 24:
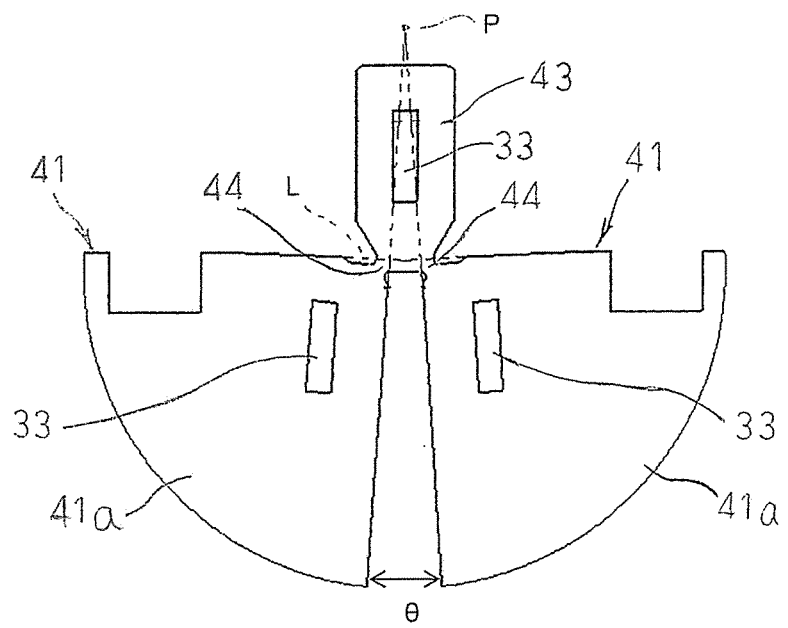
FIG. 24 is a main-part enlarged view for illustrating a periphery of a coupling portion of a core-piece coupled body in the armature according to the first embodiment of the present invention.
Figure 25:
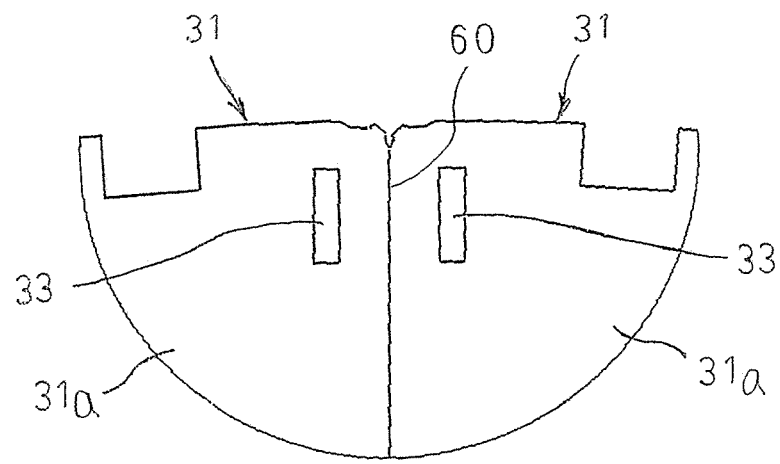
FIG. 25 is a main-part enlarged view for illustrating a periphery of an abutment portion of core backs of an inner core in the armature according to the first embodiment of the present invention.
Figure 26:
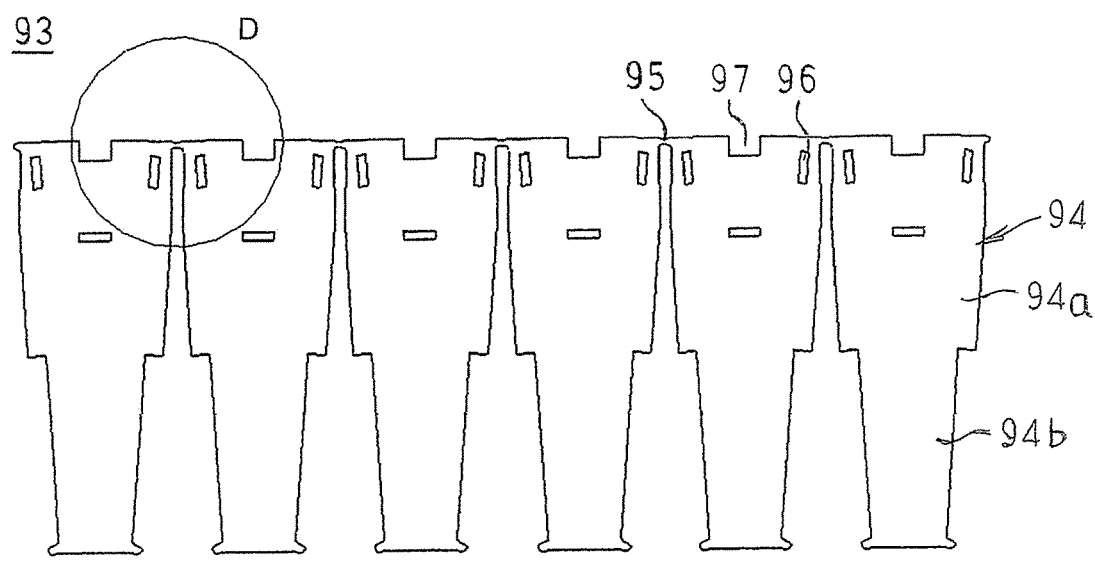
FIG. 26 is a plan view for illustrating a core-piece coupled body of a related art.
Figure 27:
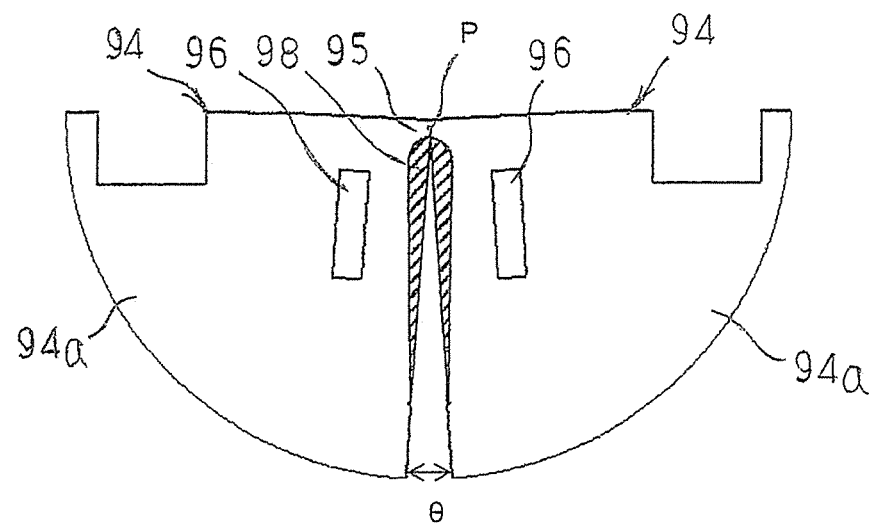
FIG. 27 is an enlarged view for illustrating the portion D of FIG. 26.
Figure 28:
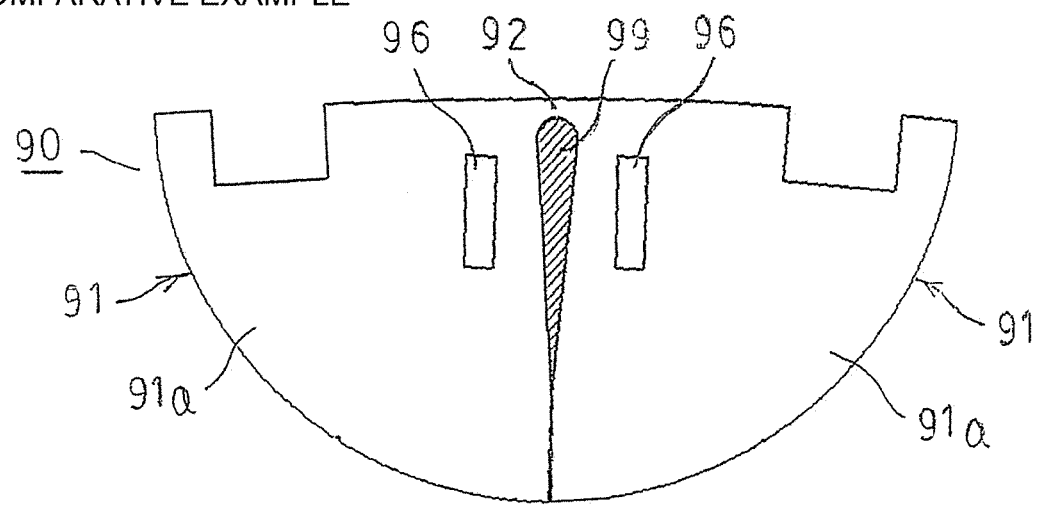
FIG. 28 is a main-part enlarged view for illustrating a periphery of an abutment portion of core backs of an inner core in an armature core of the related art.

Now, an effect of the coupling structure between the core back portions 41a of the core pieces 41 in the first embodiment is described with comparison to a related-art example. FIG. 24 is a main-part enlarged view for illustrating a periphery of the coupling portion of the core-piece coupled body in the armature according to the first embodiment of the present invention. FIG. 25 is a main-part enlarged view for illustrating a periphery of an abutment portion of the core backs of the inner core in the armature according to the first embodiment of the present invention. FIG. 26 is a plan view for illustrating a core-piece coupled body of the related art. FIG. 27 is an enlarged view for illustrating the portion D of FIG. 26. FIG. 28 is a main-part enlarged view for illustrating a periphery of an abutment portion of core backs of an inner core in an armature core of the related art.

First, the related-art example is described. As illustrated in FIG. 26, in a core-piece coupled body 93 of the related art, six core pieces 94 are continuously coupled to one another. A corner portion of a core back portion 94a of one core piece 94 on one side in a circumferential direction on an outer peripheral side and a corner portion of a core back portion 94a of another core piece 94 on another side in a circumferential direction on an outer peripheral side, which are adjacent to each other in the circumferential direction, are coupled to each other with use of one thin piece 95. The core pieces 94 each include a core back portion 94a, a tooth portion 94b, caulking portions 96, and a positioning groove 97.

When the core-piece coupled body 93 is viewed from a plate-thickness direction, as illustrated in FIG. 27, an intersecting point P of extension lines of opposed sides of adjacent core back portions 94a is located in the thin piece 95. As described above, when the intersecting point P is matched with a deformation center at the time of bending the core-piece coupled body 93, the opposed side surfaces of the core back portions 94a can be brought into abutment against each other while preventing formation of a gap. However, when the intersecting point P is located in the thin piece 95, a slit angle θ is reduced, with the result that punch becomes thinner and the stiffness is reduced. Therefore, as illustrated in FIG. 27, it has been required that relief portions 98 be formed on the thin piece 95 side of the side surfaces of the core back portions 94a.

The core-piece coupled bodies 93 each having the relief portions 98 are integrated in a state of being laminated, and the segment-core coupled body 90 is produced. The segment-core coupled body 90 has a configuration in which six segment cores 91 each being a laminated body of the core pieces 94 are continuously coupled to one another with use of the thin portions 92. The core backs 91a of the segment cores 91 are each formed by laminating the core back portions 94a of the core pieces 94. The thin portion 92 is formed by laminating the thin pieces 95. As illustrated in FIG. 28, when the segment-core coupled body 90 is bent to produce the inner core, a large gap portion 99 is formed on respective thin portion 92 sides of the abutment portions of the core backs 91a. With this, output is reduced.

Moreover, when the number of slots is increased to reduce torque pulsation, the slit angle θ is further reduced. Therefore, it has been required that a larger relief portion 98 be formed on the thin piece 95 side of the side surface of the core back portion 94a. With this, the torque pulsation can be reduced, but output is significantly reduced. As described above, the related-art example is not suitable for use in a case in which the reduction in output is not allowed and in which torque pulsation is reduced by the increase in the number of slots.

In the first embodiment, the posture holding piece 43 is coupled to each of opposed corner portions of adjacent core back portions 41 of core pieces 41 on the outer peripheral side with use of different thin pieces 44. When the core-piece coupled body 42 is viewed from the plate-thickness direction, the posture holding piece 43 projects toward the radially outer side with respect to the adjacent core back portions 41a. With this, a width of the slit portion formed between the opposed side surfaces of the adjacent core back portions 41a is increased. Therefore, the relief portion for ensuring the stiffness of the punch can be reduced. Further, as illustrated in FIG. 24, an intersecting point P of extension lines of opposed sides of adjacent core back portions 41a is located on a radially outer side with respect to an arc-shaped imaginary line L connecting arc-shaped outer peripheral sides of the adjacent core back portions 41a. With this, the width of the slit portion formed between the opposed side surfaces of the adjacent core back portions 41a is further increased. Therefore, the relief portion for ensuring the stiffness of the punch can further be reduced. Further, as illustrated in FIG. 25, when the inner core 30 is to be assembled, formation of the gap at the abutment portions 60 of the core backs 31a of the segment cores 31 adjacent to each other in the circumferential direction is prevented, thereby being capable of improving output.

Moreover, even when the slit angle θ is small, the width of the slit portion formed between the opposed side surfaces of the core back portions 41a can be increased. With this, even in the case in which the number of slots is increased, pressing can be performed substantially without forming the relief portion. As described above, the present invention is applicable to the case in which the reduction in output is not allowed and in which torque pulsation is reduced by the increase in the number of slots.

Figure 29:
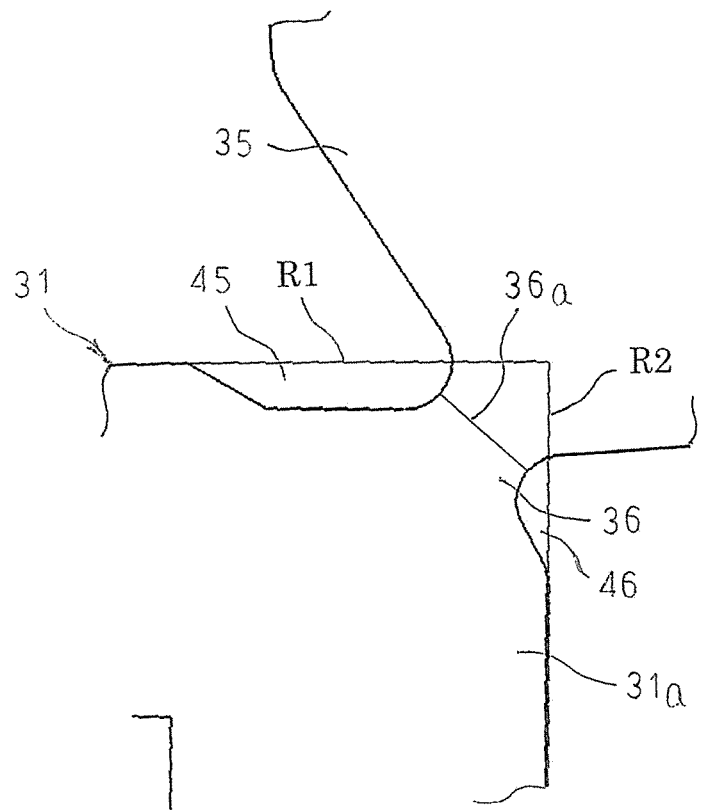
FIG. 29 is a main-part enlarged view for illustrating a periphery of a thin portion of the segment-core coupled body in the armature according to the first embodiment of the present invention.
Figure 30:
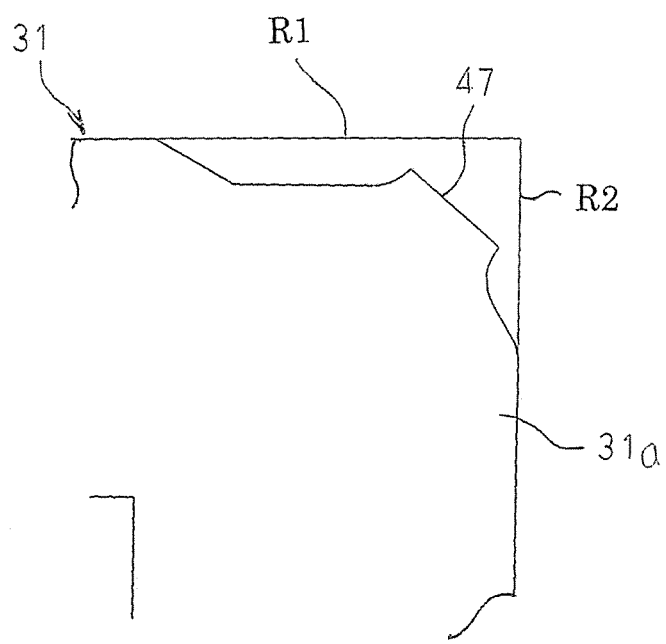
FIG. 30 is a main-part enlarged view for illustrating a periphery of a cut portion of the thin portion of the segment core in the armature according to the first embodiment of the present invention.

Next, a shape of the thin portion 36 in the first embodiment is described. FIG. 29 is a main-part enlarged view for illustrating a periphery of the thin portion of the segment-core coupled body in the armature according to the first embodiment of the present invention. FIG. 30 is a main-part enlarged view for illustrating a periphery of a cut portion of the thin portion of the segment core in the armature according to the first embodiment of the present invention.

As illustrated in FIG. 29, the core back 31a has a relief portion 45 extending in the radial direction and a relief portion 46 extending in the circumferential direction, and a minimum width portion 36a is formed at the thin portion 36. The minimum width portion 36a is located on an inner side of extension planes including an extension plane R1 of an outer peripheral surface of the core back 31a and an extension plane R2 of a side surface of the core back 31a in the circumferential direction.

As described above, the minimum width portion 36a is formed at the thin portion 36. When the posture holding portion 35 is to be bent and separated as described above, a bending stress concentrates at the minimum width portion 36a. With this, the posture holding portion 35 can be separated with a small force. Thus, the productivity is improved. Moreover, also in a case of burning off the thin portion 36 with laser, a heat capacity of the minimum width portion 36a is small, and hence temperature easily rises. With this, the posture holding portion 35 can be separated with small energy. Thus, the productivity is improved.

Moreover, the minimum width portion 36a is located on the inner side of the extension planes R1 and R2. Thus, as illustrated in FIG. 30, a cut surface 47 of the thin portion 36 is formed on the inner side of the extension planes R1 and R2. Therefore, at the time of assembling the inner core 30, interference between remaining parts of the thin portion 36 is avoided. Further, at the time of assembling the inner core 30 to the outer core 29, interference between the remaining parts of the thin portion 36 and the outer core is avoided. With this, assembly accuracy of the armature 10 is improved.

In the first embodiment described above, the thin portion 36 has the minimum width portion 36a. However, the thin portion may have a constant width.

Moreover, in the first embodiment described above, all of the posture holding pieces 43 forming the posture holding portion 35 are coupled to two core back portions 41a with different thin pieces 44. However, it is only required that the posture holding portion 35 be coupled to some of the core back portions 41a of the laminated body of the core back portions 41a on one side with the thin pieces 44 and coupled to some of core back portions 41a of the laminated body of the core back portions 41a on another side with the thin pieces 44. With this, the number of the thin pieces 44 forming the thin portion 36 is reduced. Thus, a force required for separation at the thin portion 36 is reduced, and the productivity is improved.

Moreover, in the first embodiment described above, the laminated posture holding pieces 43 are fixed with the caulking portions 33. The first fixing member for fixing the laminated posture holding pieces 43 is not limited to the caulking portion, and may be a bonding portion being a bonded part or a welding portion being a welded part. When the welding portion is used as the first fixing member, the strength and stiffness of the posture holding portion are improved. Further, it is preferred that the welding portion be formed so as to join end surfaces of the posture holding portions 43 by laser welding.

Moreover, in the first embodiment described above, the core back portions 41a are fixed with the caulking portions 33. The second fixing member for fixing the laminated posture holding pieces 43 is not limited to the caulking portion, and may be a bonding portion being a bonded part or a welding portion being a welded part. When the bonding portion is used as the second fixing member, an electric short circuit and a residual stress between the core pieces 41 is not generated, and hence the bonding portion is preferred.

Moreover, in the first embodiment described above, the coils 21 each having a shape of being wound into the shape of "8" in the radial direction is used. However, distributed winding coils such as hexagonal coils or wave winding coils may be used.

Moreover, in the first embodiment described above, the posture holding piece 43 is formed as an integrated part. However, the posture holding piece may be divided into two segments including a first segment posture holding piece and a second segment posture holding piece in the circumferential direction. In this case, it is only required that the first segment posture holding piece be coupled to the core back on one side with the thin piece, the second segment posture holding piece be coupled to another core back with the thin piece, and the first segment posture holding piece and the second segment posture holding piece be coupled to each other with the thin piece.

Second Embodiment

Figure 31:
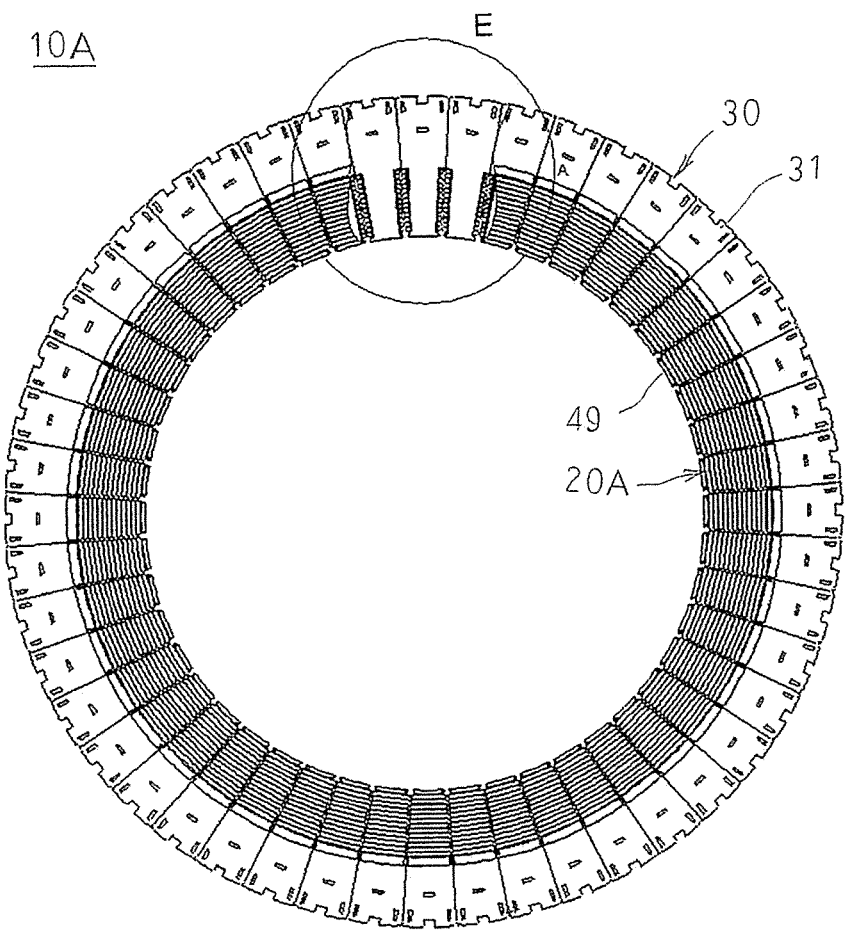
FIG. 31 is a partial breakaway end view for illustrating an armature according to a second embodiment of the present invention.
Figure 32:
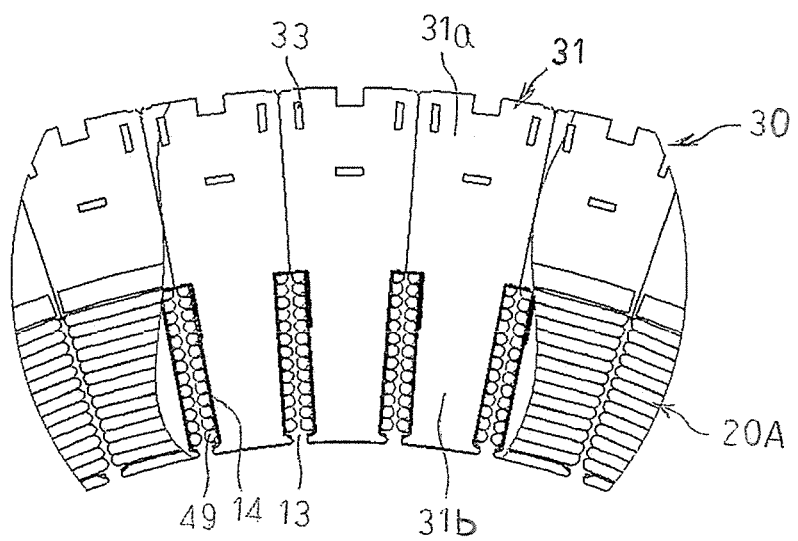
FIG. 32 is an enlarged view for illustrating the portion E of FIG. 31.
Figure 33:
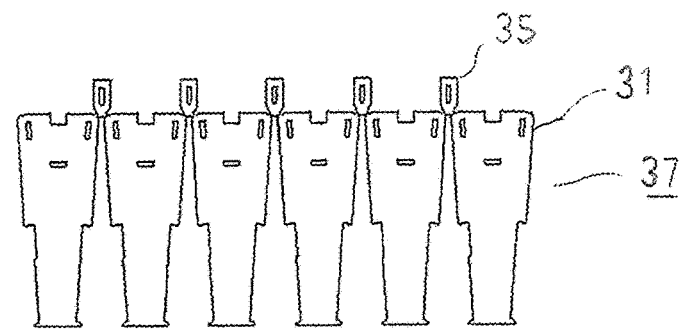
FIG. 33 is a plan view for illustrating a segment-core coupled body taken out from a die in the method of manufacturing an armature according to the second embodiment of the present invention.
Figure 34:
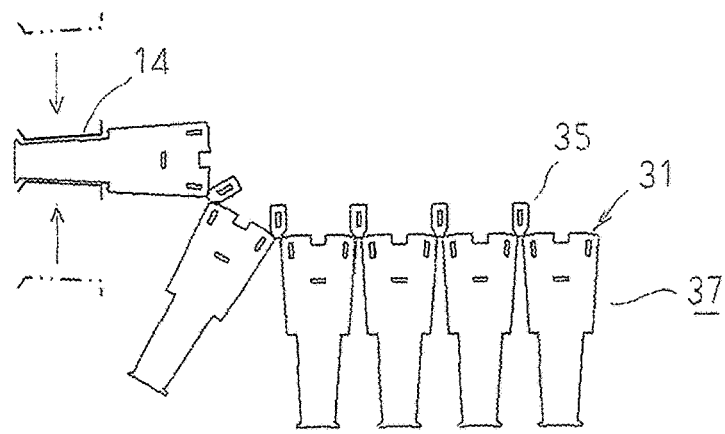
FIG. 34 is a view for illustrating an insulating member affixing step of the method of manufacturing an armature according to the second embodiment of the present invention.
Figure 35:
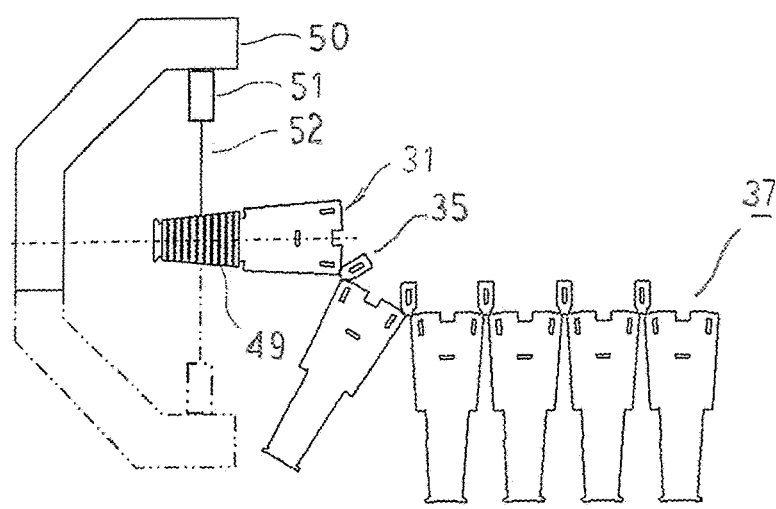
FIG. 35 is a view for illustrating a coil mounting step of the method of manufacturing an armature according to the second embodiment of the present invention.
Figure 36:
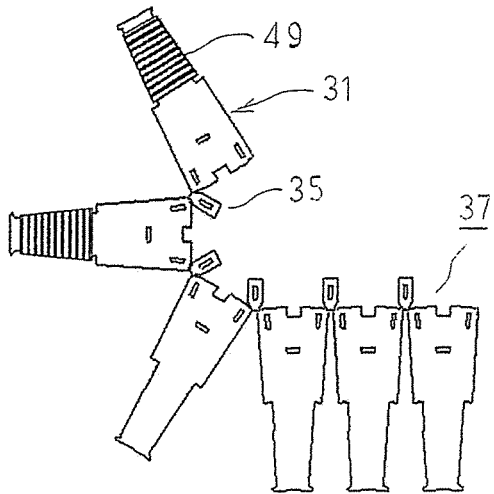
FIG. 36 is a view for illustrating a coil mounting step of the method of manufacturing an armature according to the second embodiment of the present invention.
Figure 37:
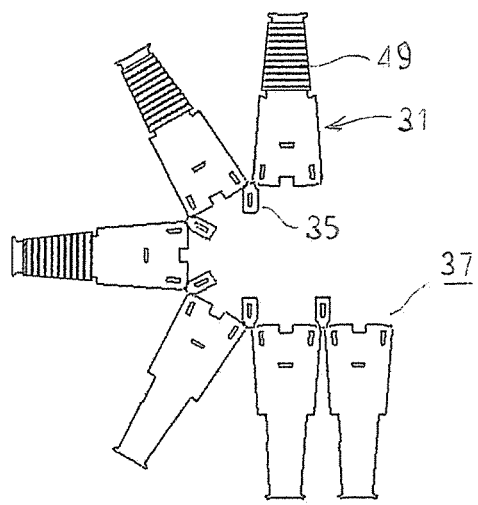
FIG. 37 is a view for illustrating a coil mounting step of the method of manufacturing an armature according to the second embodiment of the present invention.
Figure 38:
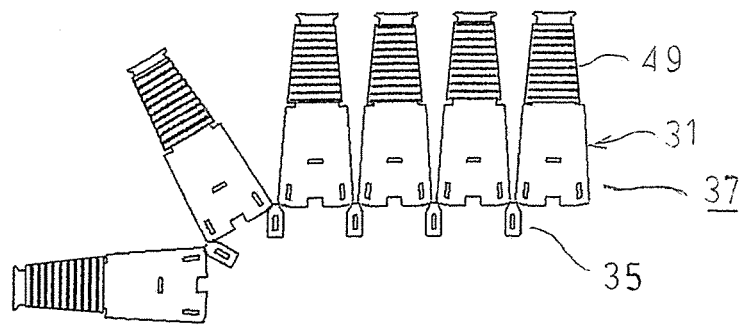
FIG. 38 is a view for illustrating the coil mounting step of the method of manufacturing an armature according to the second embodiment of the present invention.
Figure 39:
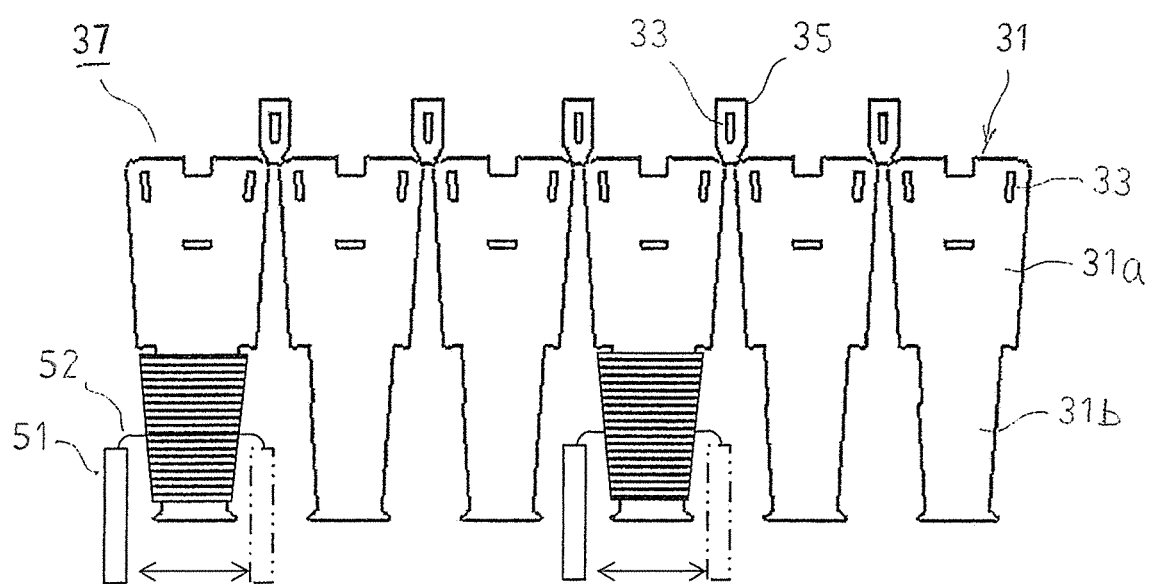
FIG. 39 is a view for illustrating a mode of performing the coil mounting step of the method of manufacturing an armature according to the second embodiment of the present invention.

FIG. 31 is a partial breakaway end view for illustrating an armature according to a second embodiment of the present invention. FIG. 32 is an enlarged view for illustrating the portion E of FIG. 31. FIG. 33 is a plan view for illustrating a segment-core coupled body taken out from a die in the method of manufacturing an armature according to the second embodiment of the present invention. FIG. 34 is a view for illustrating an insulating member affixing step of the method of manufacturing an armature according to the second embodiment of the present invention. FIG. 35 is a view for illustrating a coil mounting step of the method of manufacturing an armature according to the second embodiment of the present invention. FIG. 36 to FIG. 38 are views for illustrating the coil mounting step of the method of manufacturing an armature according to the second embodiment of the present invention. FIG. 39 is a view for illustrating a mode of performing the coil mounting step of the method of manufacturing an armature according to the second embodiment of the present invention. In FIG. 31 and FIG. 32, the armature is illustrated without the outer core.

In FIG. 31 and FIG. 32, an armature winding 20A is formed of concentrated winding coils 49 respectively wound around the segment cores 31.

Other configurations are the same as those of the first embodiment described above.

Next, a method of manufacturing an armature 10A having such a configuration is described with reference to FIG. 33 to FIG. 38.

First, the segment-core coupled body 37 is produced by the same processes as those of the first embodiment described above. Then, as illustrated in FIG. 33, the segment-core coupled body 37 is taken out from a die. Next, the thin portions 36 are bent so that a length direction of the tooth 31b of the first segment core 31 is opened by 90° with respect to the tooth 31b of the third segment core 31. Next, in an insulating member affixing step, as illustrated in FIG. 34, the insulating members 14 are affixed to both side surfaces of the tooth 31b of the first segment core 31. Next, in a coil mounting step, as illustrated in FIG. 35, a nozzle holder 50 is rotated around the tooth 31b of the first segment core 31. With this, a wire 52 is paid out from a nozzle 51 and wound around the tooth 31 having the insulating members 14 affixed thereto.

Next, as illustrated in FIG. 36 and FIG. 37, while the thin portions 36 are bent, the insulating member affixing step and the coil mounting step are alternately repeated to mount the concentrated winding coils 49 to the teeth 31b of the second, third, and subsequent segment cores 31. As illustrated in FIG. 38, after the concentrated winding coils 49 have been mounted to the teeth 31b of all of the segment cores 31, the posture holding portions 35 are removed, and the segment cores 31 are separated. Next, the core backs 31a are brought into abutment against one another at respective side surfaces in the circumferential direction so that the segment cores 31 are annularly arranged. Then, the segment cores 31 are received in the outer core 29 by press-fitting or shrink fitting, thereby assembling the armature 10A.

In the second embodiment, the core backs 31a of the segment cores 31 of the segment-core coupled body 37 are coupled with the thin portions 36. Therefore, the teeth 31b of the adjacent segment cores 31 of the segment-core coupled body 37 can easily be opened by bending the thin portions 36. With this, the insulating members 14 can easily be mounted to the tooth 31b. Thus, the productivity is improved.

Subsequent to the process of mounting the insulating members 14 to the tooth 31b, the concentrated winding coil 49 can be mounted to a target tooth 31b without interference with an adjacent segment core 31. Thus, the productivity is improved. The wire 52 can be continuously wound around the six segment cores 31 of the segment-core coupled body 37 without cutting the wire 52, and hence connecting components such as a wiring plate can be omitted. Thus, the productivity is improved.

The coils are the concentrated winding coils 49, and hence the wire 52 can be orderly wound around the teeth 31b. With this, a space factor is improved, and higher output and higher efficiency can be achieved.

The coupling portions provided between the adjacent core backs 31a are formed of two thin portions 36, and hence a bending angle between the adjacent core backs 31a is formed by the two thin portions 36. Meanwhile, in the related-art example in which the coupling portion is formed of one thin portion, the bending angle between the adjacent core backs 31a is formed by one thin portion. As described above, the bending angle formed by each thin portion is a half of the bending angle of the thin portion of the related-art example. With this, an electromagnetic steel sheet having less bendability, a small extension amount to breakage, and a large silicon content can be adopted. Thus, a higher efficiency can be achieved. The electromagnetic steel sheet has a silicon content of from 2 wt % to 8 wt %.

Moreover, the posture holding portion 35 is coupled to the two core backs 31a at different thin portions 36. When the segment-core coupled body 37 is viewed from a laminating direction, an intersecting point P of extension lines of opposed sides of the adjacent core backs 31a is located on a radially outer side of an imaginary line connecting an outer peripheral side of the adjacent core back 31a. With this, a distance between the teeth 31b of the adjacent segment cores 31 can suitably be adjusted by bending the two thin portions 36 connected to the posture holding portion 35.

Thus, the thin portions 36 are bent to increase a distance between the teeth 31b of the adjacent segment cores 31 of the segment-core coupled body 37 having been taken out from the die and linearly expanded is increased. Then, the insulating members 14 are affixed to side portions of the tooth 31b. Next, the thin portions 36 are bent to increase the distance between the teeth 31b, thereby ensuring a wire-winding space for the nozzle 51. Next, as illustrated in FIG. 39, the wire 52 is wound around the teeth 31b of the segment-core coupled body 37 to mount the concentrated winding coils 49 to the teeth 31b. With this, under the state in which the segment-core coupled body 37 is linearly expanded, the insulating members 14 and the concentrated winding coils 49 can be mounted to the segment-core coupled body 37. Thus, the productivity is improved.

Third Embodiment

Figure 40:
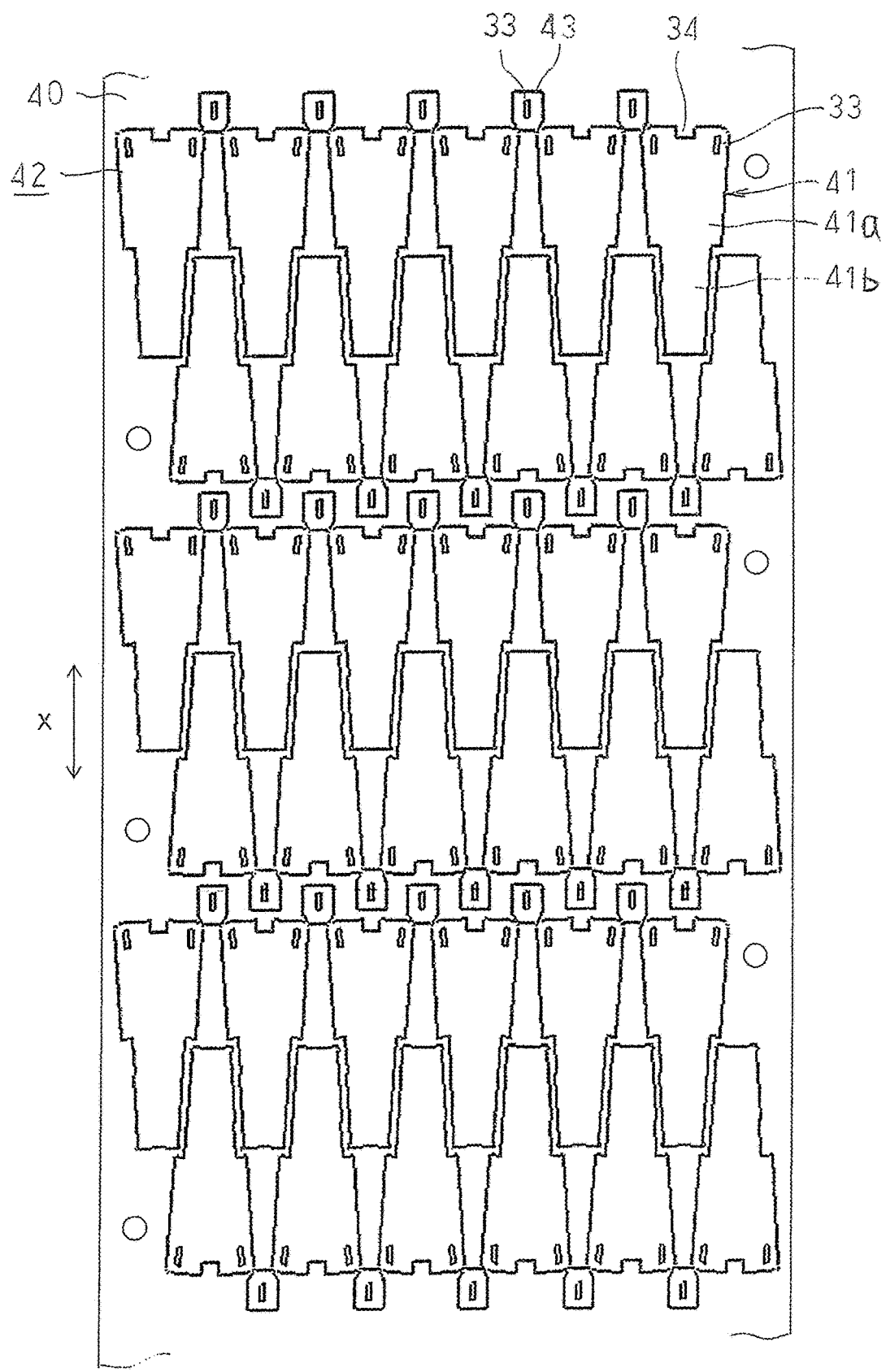
FIG. 40 is a plan view for illustrating arrangement of material cutting in a pressing step of a method of manufacturing an armature according to a third embodiment of the present invention.

FIG. 40 is a plan view for illustrating arrangement of material cutting in a pressing step of a method of manufacturing an armature according to a third embodiment of the present invention.

In the third embodiment, as illustrated in FIG. 40, an arrangement direction of the core pieces 41 of the core-piece coupled body 42 is oriented in a width direction of the elongated belt-like body 40, and the core-piece coupled bodies 42 are stamped from the elongated belt-like body 40 in a staggered pattern so that the tooth portions 41b of the core pieces 41 of one core-piece coupled body 42 are each located between the tooth portions 41b of adjacent core pieces 41 of another core-piece coupled body 42.

According to the third embodiment, the core-piece coupled bodies 42 are stamped in the staggered pattern. Thus, a material yield is improved, and reduction in the amount of material is achieved.

In the related-art example, as illustrated in FIG. 27, the two core back portions 94a are coupled to each other by one thin piece 95, and the intersecting point P of the extension lines of the opposed side surfaces of the core back portions 94a is located in the thin piece 95. Therefore, whether the core-piece coupled body 93 can be stamped in the staggered pattern is determined depending on a ratio of a circumferential width of the tooth portion 94b and a circumferential width of the slot portion. When the circumferential width of the tooth portion 94b is relatively larger than the circumferential width of the slot portion, the core-piece coupled body 93 cannot be stamped in the staggered pattern. Thus, the material yield is degraded.

In the present invention, the posture holding piece 43 is coupled to the two core back portions 41a at different thin pieces 44. When the core-piece coupled body 42 is viewed from a laminating direction, an intersecting point P of extension lines of opposed sides of the adjacent core back portions 41a is located on a radially outer side of an imaginary line L connecting an outer peripheral side of the adjacent core back portions 41a. With this, a distance between the tooth portions 41b of the adjacent core pieces 41 can suitably be adjusted. Thus, the core-piece coupled body 42 can be stamped in the staggered pattern. Further, the stamping pitch of the core-piece coupled body 42 can be optimally adjusted. Thus, the material yield can further be improved.

Fourth Embodiment

Figure 41:
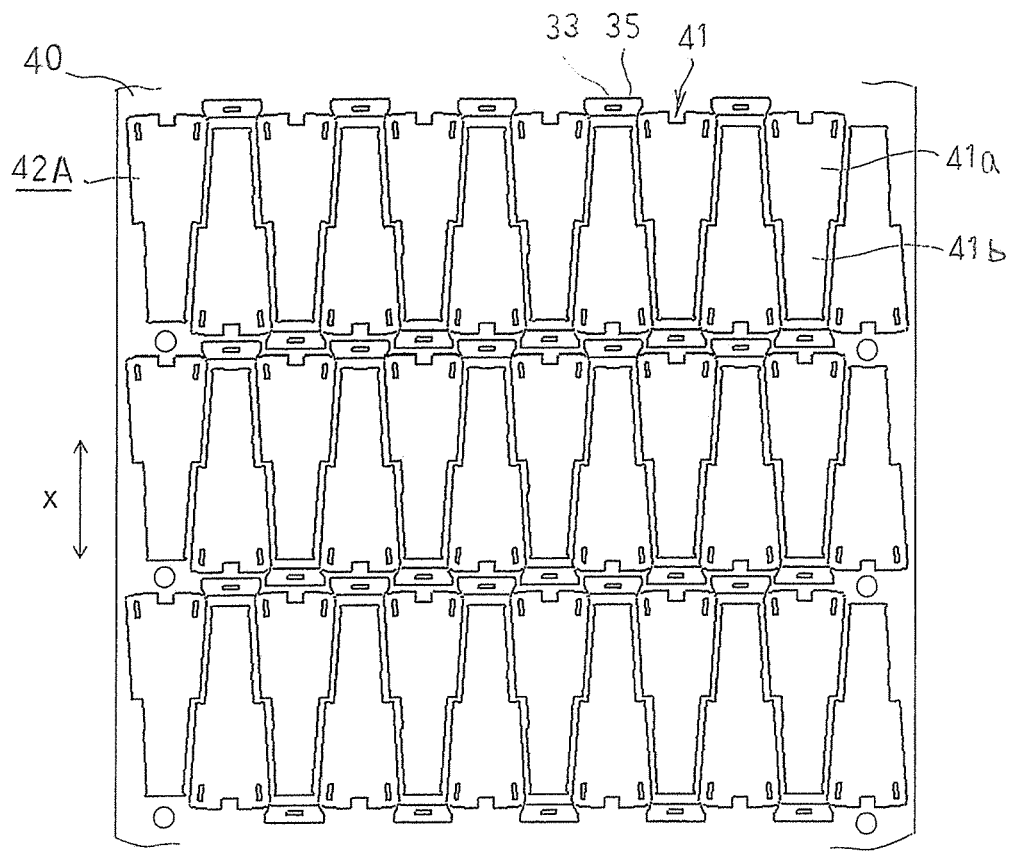
FIG. 41 is a plan view for illustrating arrangement of material cutting in a pressing step of a method of manufacturing an armature according to a fourth embodiment of the present invention.

FIG. 41 is a plan view for illustrating arrangement of material cutting in a pressing step of a method of manufacturing an armature according to a fourth embodiment of the present invention.

In the fourth embodiment, as illustrated in FIG. 41, an arrangement direction of the core pieces 41 of the core-piece coupled body 42A is oriented in a width direction of the elongated belt-like body 40, and the core-piece coupled bodies 42A are stamped from the elongated belt-like body 40 in a staggered pattern so that the tooth portions 41b of the core pieces 41 of one core-piece coupled body 42A are each located between the core back portions 41a of adjacent core pieces 41 of another core-piece coupled body 42A.

According to the fourth embodiment, the core-piece coupled bodies 42A are stamped in the staggered pattern that the tooth portions 41b of the core pieces 41 of one core-piece coupled body 42A are each located between the core back portions 41a of the adjacent core pieces 41 of another core-piece coupled body 42. Thus, the material yield is further improved, and the reduction in the amount of material is further achieved.

Moreover, a width of the slit portion between the adjacent core back portions 41a of the core-piece coupled body 42A is increased, and hence the strength and stiffness of the punch are improved. Thus, the productivity is improved.

Fifth Embodiment

Figure 42:
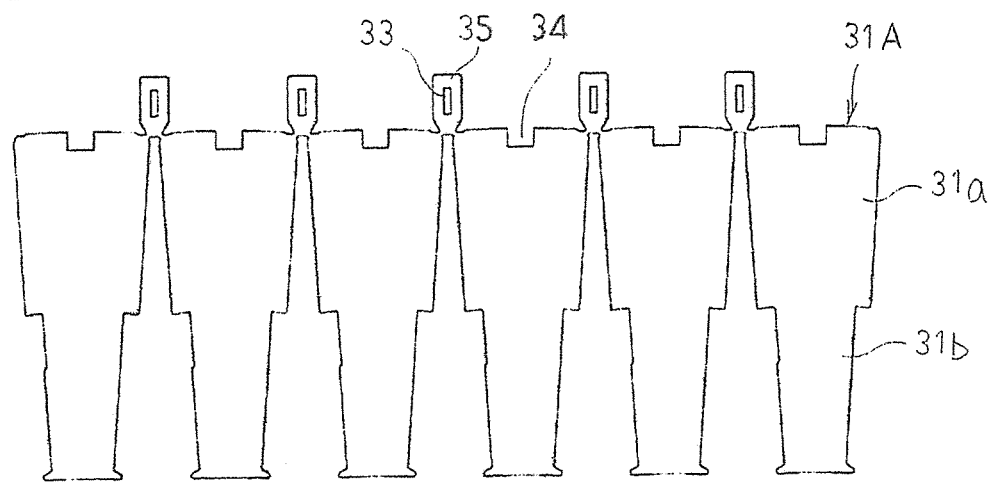
FIG. 42 is an end view for illustrating a segment-core coupled body in an armature according to a fifth embodiment of the present invention, as viewed from an axially outer side.
Figure 43:
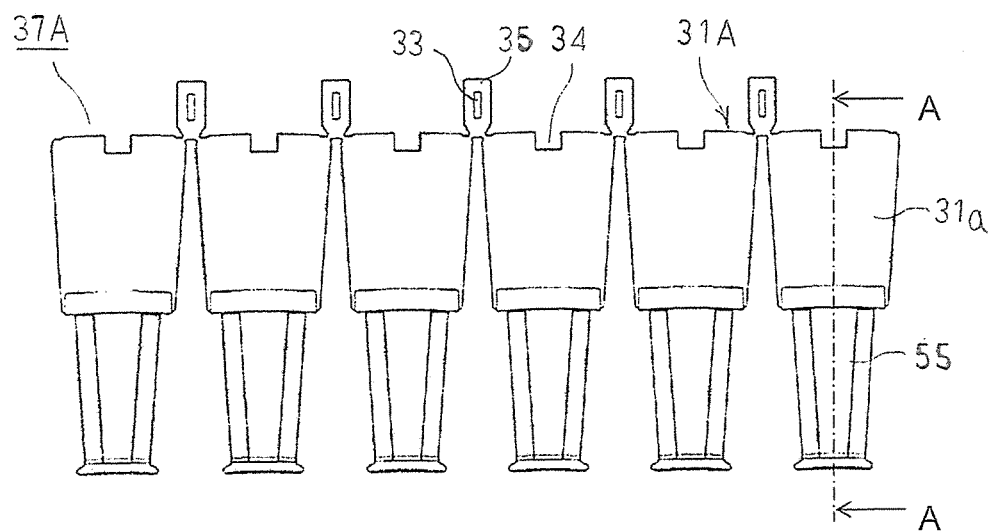
FIG. 43 is an end view for illustrating the segment-core coupled body having teeth fixed with a molded resin formed body in the armature according to the fifth embodiment of the present invention, as viewed from the axially outer side.
Figure 44:
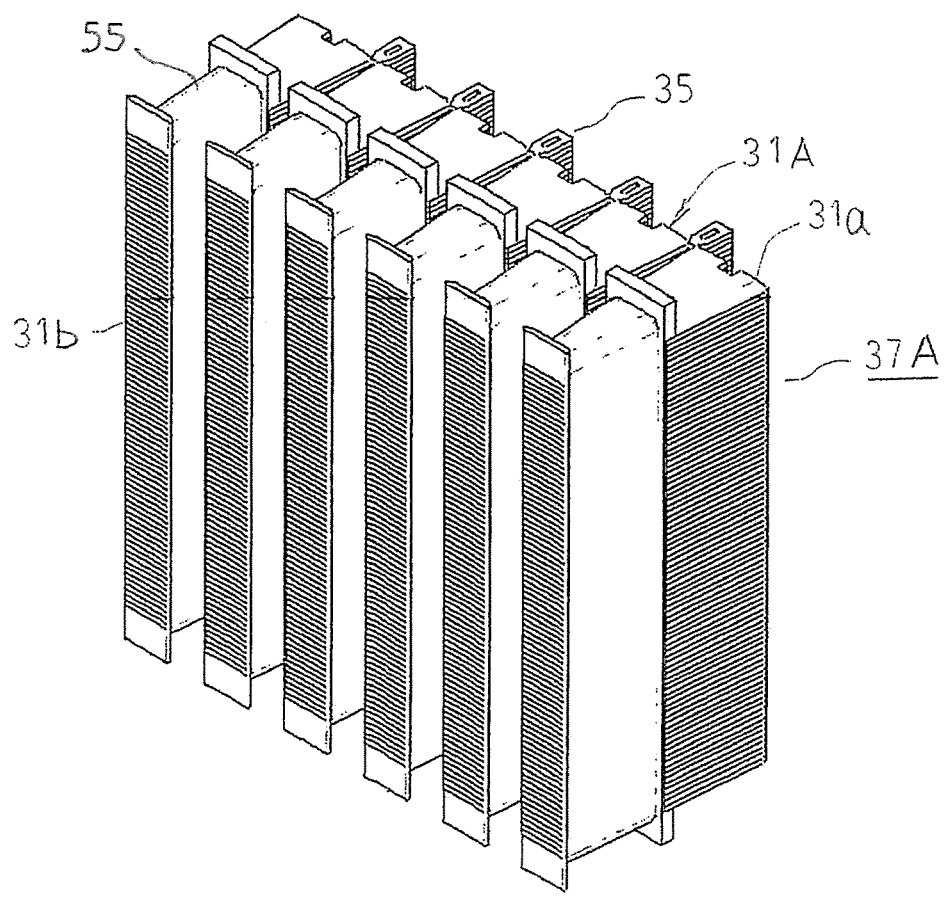
FIG. 44 is a perspective view for illustrating the segment-core coupled body having teeth formed through molding in the armature according to the fifth embodiment of the present invention.
Figure 45:
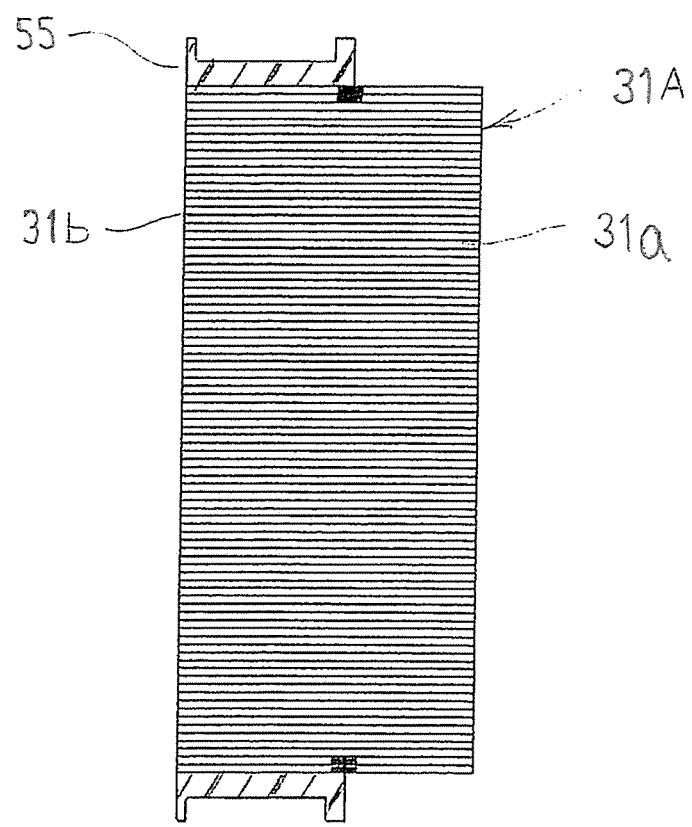
FIG. 45 is a sectional view taken along the line A-A of FIG. 43, as viewed from the direction indicated by the arrows.

FIG. 42 is an end view for illustrating a segment-core coupled body in an armature according to a fifth embodiment of the present invention, as viewed from an axially outer side. FIG. 43 is an end view for illustrating the segment-core coupled body having teeth fixed with a molded resin formed body in the armature according to the fifth embodiment of the present invention, as viewed from the axially outer side. FIG. 44 is a perspective view for illustrating the segment-core coupled body having teeth formed through molding in the armature according to the fifth embodiment of the present invention. FIG. 45 is a sectional view taken along the line A-A of FIG. 43, as viewed from the direction indicated by the arrows.

In the fifth embodiment, the segment-core coupled body 37A illustrated in FIG. 42 is taken out from the die. The segment-core coupled body 37A is different from the segment-core coupled body 37 of the first embodiment described above in that the core back 31a is formed by coupling the segment cores 31A which are not fixed by caulking.

The segment-core coupled body 37A is held with the posture holding portions 35 to which the segment cores 31A are fixed by caulking. Therefore, the segment-core coupled body 37A can easily be taken out from the die without separating the core-piece coupled body.

Both side surfaces and both end surfaces of each of the teeth 31b of the segment-core coupled body 37A having been taken out from the die are covered with a molded resin 55 being a second fixing member by molding. With this, as illustrated in FIG. 43 to FIG. 45, the molded resin 55 is formed so as to surround each of the teeth 31b, and the segment cores 31 are fixed. Subsequently, the armature is assembled by the steps of the first embodiment or the second embodiment described above.

In the fifth embodiment, the segment cores 31 are not fixed by caulking. Therefore, the core pieces are not electrically short-circuited, and hence an efficiency of the rotating electric machine can be improved. Further, the segment cores 31 each do not have the caulking portion having a residual stress. Therefore, a hysteresis loss is reduced, thereby being capable of improving the efficiency of the rotating electric machine.

Sixth Embodiment

Figure 46:
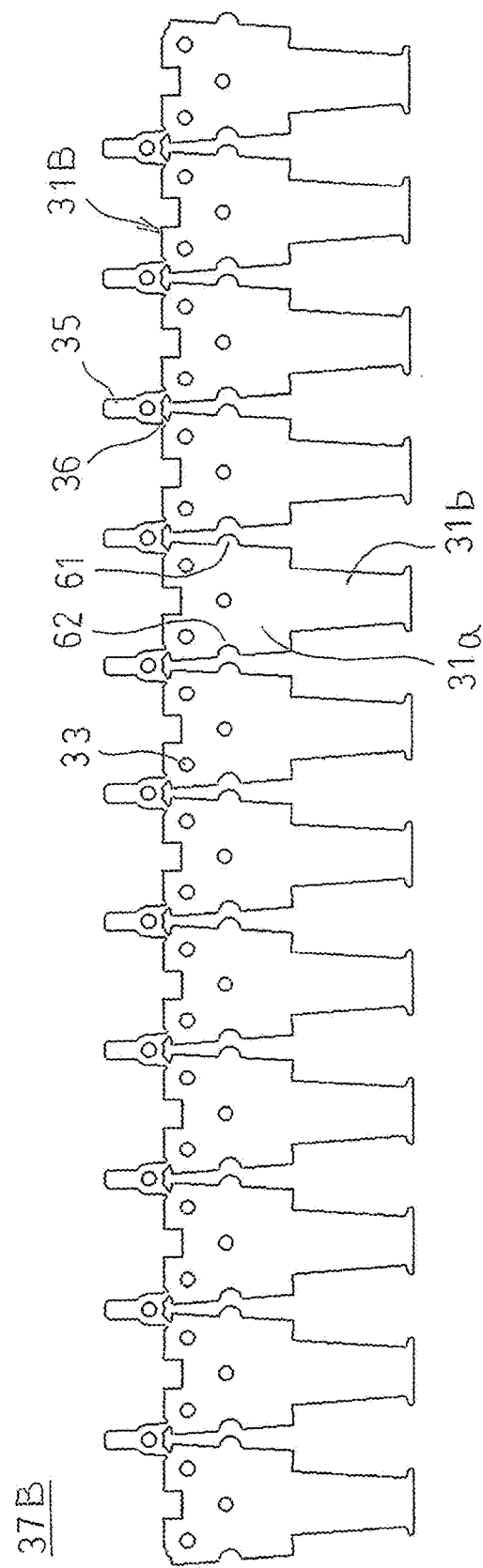
FIG. 46 is a plan view for illustrating a segment-core coupled body in an armature according to a sixth embodiment of the present invention.
Figure 47:
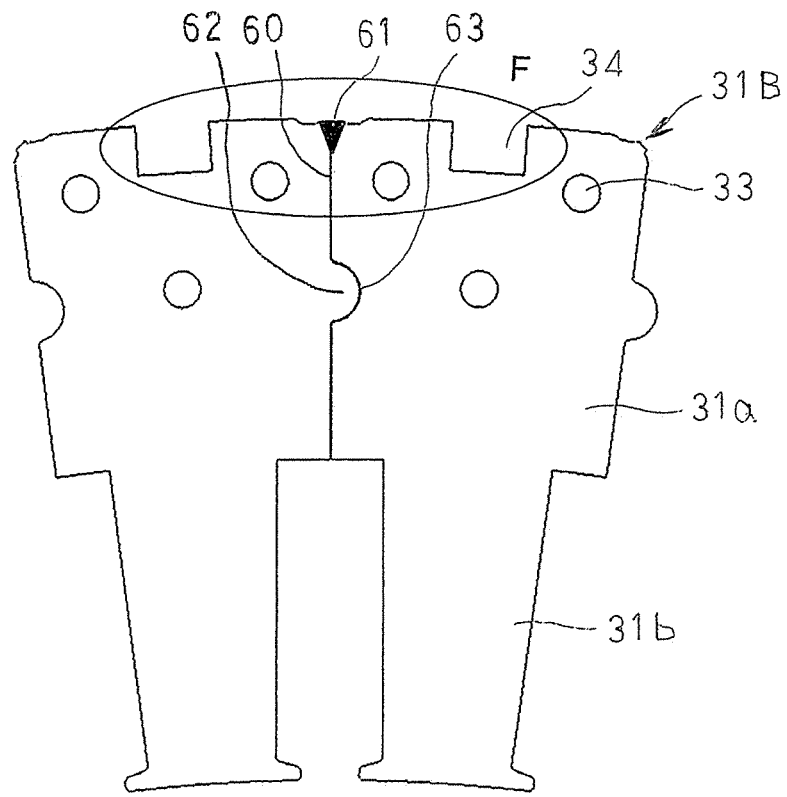
FIG. 47 is a plan view for illustrating two adjacent segment cores extracted from the armature according to the sixth embodiment of the present invention.
Figure 48:
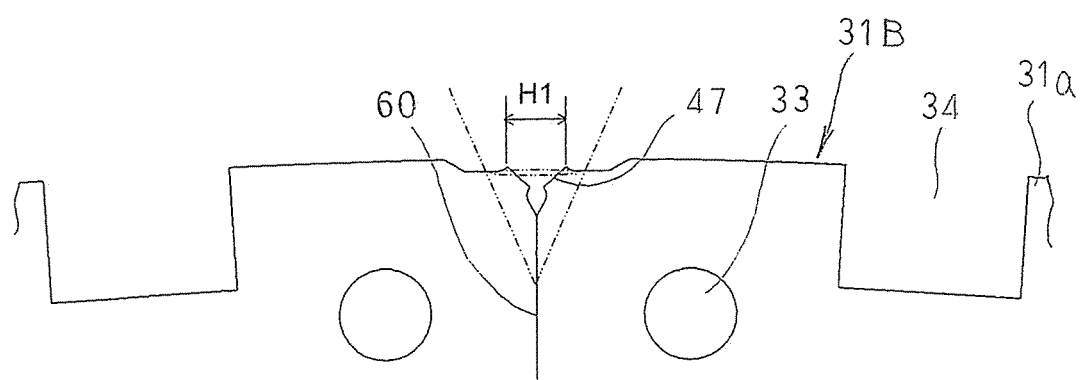
FIG. 48 is an enlarged view for illustrating the portion F of FIG. 47.
Figure 49:
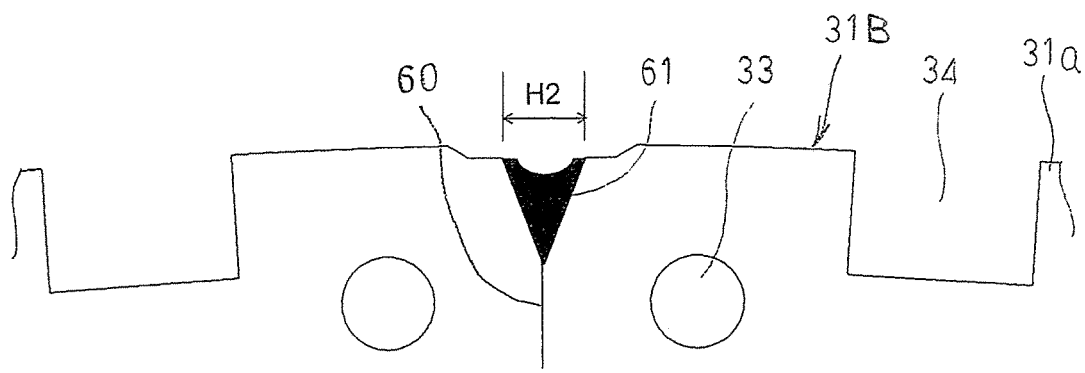
FIG. 49 is an enlarged view for illustrating the portion F of FIG. 47.

FIG. 46 is a plan view for illustrating a segment-core coupled body in an armature according to a sixth embodiment of the present invention. FIG. 47 is a plan view for illustrating two adjacent segment cores extracted from the armature according to the sixth embodiment of the present invention. FIG. 48 and FIG. 49 are enlarged views for illustrating the portion F of FIG. 47. FIG. 48 is an illustration of a state before welding, and FIG. 49 is an illustration of a state after welding. In FIG. 47, the armature is illustrated without the concentrated winding coils mounted to the teeth 31b.

In FIG. 46, a segment-core coupled body 37B has a configuration in which a set number of core-piece coupled bodies having been stamped from the elongated belt-like body are laminated on one another. The segment-core coupled body 37B includes twelve segment cores 31B coupled by the posture holding portions 35 and the thin portions 36. The segment cores 31B each include a fitting protrusion portion 62 and a fitting recess portion 63. The fitting protrusion portion 62 is formed on one side surface of the core back 31a. The fitting recess portion 63 is formed on another side surface of the core back 31a. The fitting protrusion portion 62 and the fitting recess portion 63 are formed simultaneously in each of the core back portions of the core pieces in the pressing step.

The twelve segment cores 31B are separated from one another by cutting the thin portions 36. Then, forty-eight segment cores 31B are annularly arranged by bringing the core backs 31a into abutment against one another, thereby producing the inner core. On this occasion, as illustrated in FIG. 47, the adjacent segment cores 31B are positioned by fitting the fitting protrusion portions 62 to the fitting recess portions 63. The core backs 31a of the adjacent segment cores 31B are joined to each other through laser welding on the abutment portions 60 of the core backs 31a from a radially outer side. As described above, the forty-eight segment cores 31B forming the inner core are fixed to one another by beads 61 being welding portions, and hence the outer core may be omitted.

In the sixth embodiment, the adjacent segment cores 31B are joined to each other by the bead 61. Thus, the stiffness of the armature core is improved, and an effect of reducing vibration and noise can be attained.

Now, a mode of the bead 61 being the welding portion is described. In FIG. 48, a maximum distance between cut surfaces 47 of the thin portions of the adjacent segment cores 31B in the circumferential direction is represented by H1, and a range of the two-dot chain line corresponds to an irradiation range of laser light. In FIG. 49, a circumferential width of the bead 61 formed by laser welding is represented by H2.

The cut surface 47 of the thin portion has a minute amount of burr. Therefore, a motor which receives vibration having a large magnitude has a risk in that the burr of the cut surface 47 drops off.

In the sixth embodiment, the circumferential width H2 of the bead 61 is set larger than the maximum distance H1 of the adjacent cut surfaces 47 in the circumferential direction. That is, the bead 61 is formed in a circumferential region including the cut surfaces 47 which are opposed to each other across the abutment portion 60. With this, the burr formed on the cut surface 47 can reliably be melted, thereby being capable of preventing burr from dropping off. As described above, the armature according to the sixth embodiment is effective for the case in which the armature is applied to the motor which receives vibration having a large magnitude.

Seventh Embodiment

Figure 50:
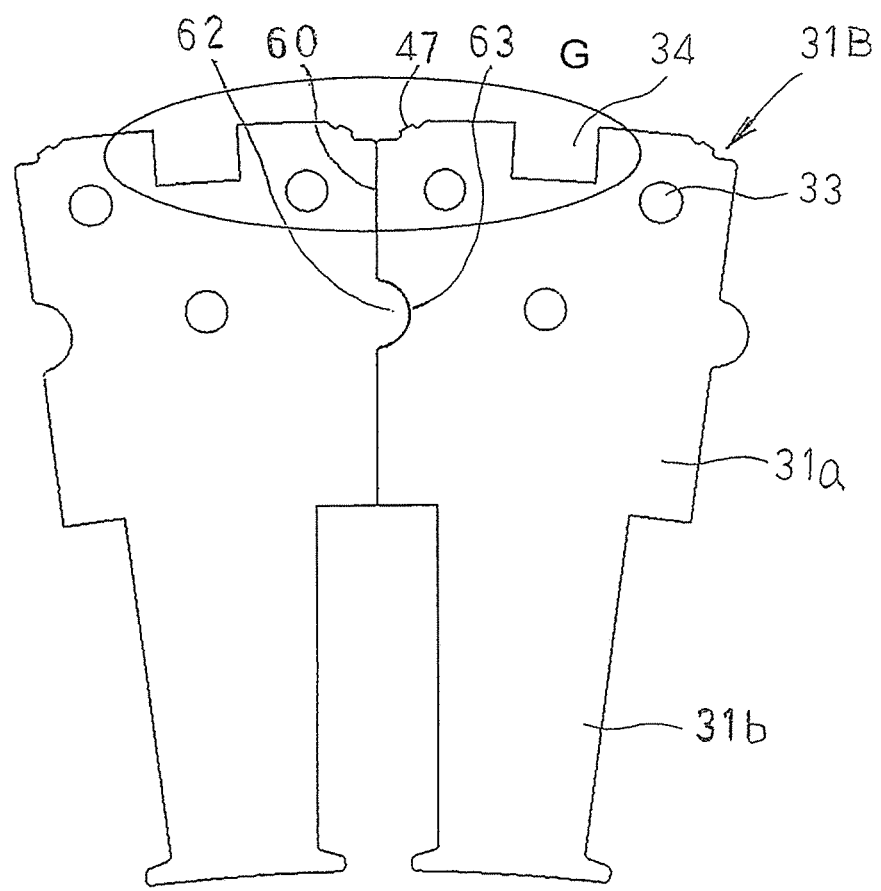
FIG. 50 is a plan view for illustrating two adjacent segment cores extracted from an armature according to a seventh embodiment of the present invention.
Figure 51:
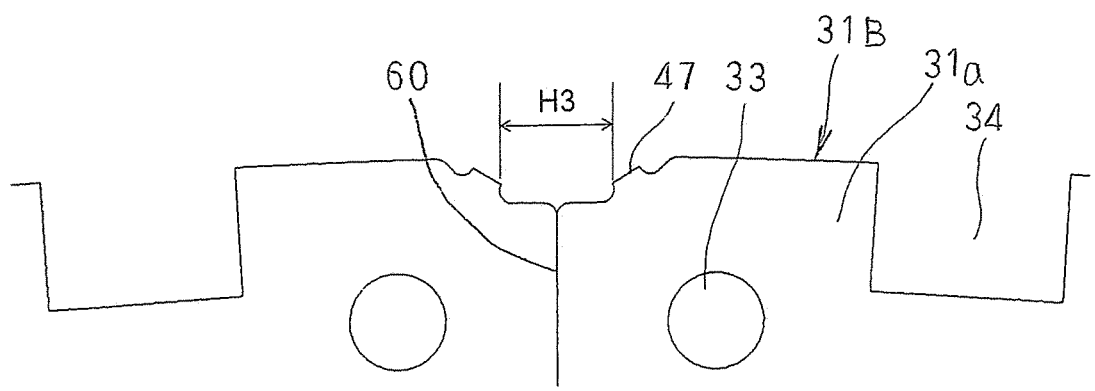
FIG. 51 is an enlarged view for illustrating the portion G of FIG. 50.
Figure 52:
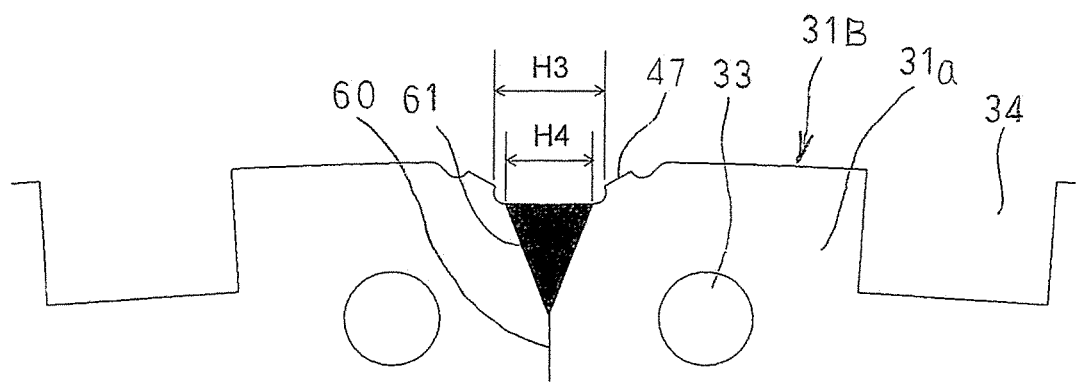
FIG. 52 is an enlarged view for illustrating the portion G of FIG. 50.

FIG. 50 is a plan view for illustrating two adjacent segment cores extracted from the armature according to the seventh embodiment of the present invention. FIG. 51 and FIG. 52 are enlarged views for illustrating the portion G of FIG. 50. FIG. 51 is an illustration of a state before welding, and FIG. 52 is an illustration of a state after welding. In FIG. 50, the armature is illustrated without the concentrated winding coils mounted to the teeth 31b.

The seventh embodiment is the same as the sixth embodiment except for the mode of the bead 61 which joins the core backs 31a of the adjacent segment cores 31B.

In FIG. 51 and FIG. 52, a minimum distance between cut surfaces 47 of the thin portions of the adjacent segment cores 31B in the circumferential direction is represented by H3. In FIG. 52, a circumferential width of the bead 61 formed by laser welding is represented by H4.

In the seventh embodiment, the circumferential width H4 of the bead 61 is set smaller than the minimum distance H3 between the adjacent cut surfaces 47 in the circumferential direction so that the cut surfaces 47 are prevented from being included in the bead 61. That is, the bead 61 is formed in a circumferential region between the cut surfaces 47 opposed to each other across the abutment portion 60, specifically, in a region on another cut surface 47 side with respect to one cut surface 47 and on one cut surface 47 side with respect to another cut surface 47. With such a configuration, the amount of iron contained in the bead 61 is stabilized, thereby being capable of obtaining a large joining strength. When the large joining strength is obtained, the motor becomes less liable to vibrate, and hence an effect of suppressing noise is attained. The armature according to the seventh embodiment is effective for the case in which the armature is applied to a motor for which, in particular, quietness is demanded.

REFERENCE SIGNS LIST

14 insulating member, 31, 31A, 31B segment core, 31*a* core back, 31*b* tooth, 33 caulking portion (first fixing member), 35 posture holding portion (coupling portion), 36 thin portion (coupling portion), 36*a* minimum width portion, 37 segment-core coupled body, 40 elongated belt-like body, 41 core piece (magnetic sheet), 41*a* core back portion, 41*b* tooth portion, 42, 42A core-piece coupled body, 43 posture holding piece (coupling piece), 44 thin piece (coupling piece), 47 cut surface, 52 wire, 55 molded resin, 60 abutment portion, 61 bead (welding portion), L imaginary line, P intersecting point

The invention claimed is:

1. A segment-core coupled body, comprising:
a plurality of segment cores, each including a core back having an arc shape and a tooth projecting from the core back toward a radially inner side; and
a plurality of coupling portions configured to couple the core backs to one another, to thereby continuously and linearly arrange the plurality of segment cores,
wherein the plurality of segment cores are coupled to one another only by the plurality of coupling portions, and
wherein the plurality of segment cores and the plurality of coupling portions are each a laminated body of magnetic sheets,
wherein the plurality of coupling portions each include:
a posture holding portion adjacent to a gap defined between adjacent core backs;
a first thin portion configured to couple one corner portion of opposed corner portions of the adjacent core backs on an outer peripheral side and the posture holding portion; and
a second thin portion configured to couple another corner portion of the opposed corner portions of the adjacent core backs on the outer peripheral side and the posture holding portion, and
wherein, when viewed from a lamination direction of the laminated body, the posture holding portion projects toward a radially outer side with respect to the adjacent core backs and is located radially outward of radially outermost peripheral surfaces of the core backs.

2. The segment-core coupled body according to claim 1, wherein the plurality of segment cores have a configuration in which side surfaces of adjacent core backs in a circumferential direction are arranged in an arc shape under a state in which the posture holding portions are separated at the first thin portion and the second thin portion.

3. The segment-core coupled body according to claim 1, wherein, when viewed from the lamination direction of the laminated body, an intersecting point of extension lines of opposed sides of the adjacent core backs is located on a radially outer side with respect to an imaginary line connecting outer peripheral sides of the adjacent core backs.

4. The segment-core coupled body according to claim 1, wherein the magnetic sheets for forming each of the plurality of posture holding portions and being laminated on one another are fixed with use of a first fixing member.

5. The segment-core coupled body according to claim 4, wherein the first fixing member is a caulking portion or a welding portion.

6. The segment-core coupled body according to claim 4, wherein the laminated magnetic sheets for forming each of the plurality of the segment core and being laminated on one another are fixed with use of a second fixing member.

7. The segment-core coupled body according to claim 6, wherein the second fixing member is a bonding portion.

8. The segment-core coupled body according to claim 6, wherein each of the plurality of posture holding members is connected at the first thin portion to a part of a magnetic sheet for forming one core back of the adjacent core backs, and is connected at the second thin portion to a part of a magnetic sheet for forming another core back of the adjacent core backs.

9. The segment-core coupled body according to claim 4,
wherein each of the first thin portion and the second thin portion has a minimum width portion, and
wherein the minimum width portion is located on an inner side of the outer peripheral surfaces of core backs, to which the first thin portion and the second thin portion are coupled, and is located on a circumferentially inner side of side surfaces of the core backs.

10. The segment-core coupled body according to claim 1,
wherein the minimum width portion is located on an inner side of the outer peripheral surfaces of core back, to which the first thin portion and the second thin portion are coupled and is located on a circumferentially inner side of side surfaces of core backs, which is the surface where the adjacent core backs in a circumferential direction contact each other when the plurality of segment cores are arranged in an arc shape.

11. A method of manufacturing an armature, comprising:
a pressing step of stamping core-piece coupled bodies from a magnetic elongated belt-like body;
a laminating step of laminating the core-piece coupled bodies having been stamped to produce a segment-core coupled body; and
a separating step of separating segment cores from the segment-core coupled body,
wherein the core-piece coupled body having been stamped from the elongated belt-like body has a configuration in which a plurality of core pieces each including a core back portion having an arc shape and a tooth portion projecting from the core back portion toward a radially inner side are coupled to one another at the core back portions only with use of coupling pieces and are continuously and linearly arranged,
wherein the coupling pieces each include:
a posture holding piece adjacent to a gap defined between adjacent core back portions;
a first thin piece configured to couple one corner portion of opposed corner portions of the adjacent core back portions on an outer peripheral side and the posture holding piece; and
a second thin piece configured to couple another corner portion of the opposed corner portions of the adjacent core back portions on the outer peripheral side and the posture holding piece,
wherein, when viewed from a plate thickness direction of the core piece, the posture holding piece projects toward a radially outer side with respect to the adjacent core back portions and is located radially outward of radially outermost peripheral surfaces of the adjacent core back portions, and wherein the segment-core coupled body has a configuration in which the segment cores each formed of a core back being a laminated body of the core back portions and a tooth being a laminated body of the tooth portions are coupled to one another by a first thin portion being a laminated body of the first thin pieces, a posture holding portion being a laminated body of the posture holding pieces, and a second thin portion being a laminated body of the second thin pieces, and are continuously and linearly arranged.

12. The method of manufacturing an armature according to claim 11, wherein, in the separating step, the first thin portion and the second thin portion are cut by reciprocatingly moving the posture holding portion or the core back in a plane of the core piece.

13. The method of manufacturing an armature according to claim 11, wherein, when viewed from the plate thickness direction of the core piece, an intersecting point of extension lines of opposed side pieces of the adjacent core back portions is located on a radially outer side with respect to an imaginary line connecting outer peripheral pieces of the adjacent core back portions.

14. The method of manufacturing an armature according to claim 11,
wherein, in the pressing step, the core-piece coupled body is stamped from the elongated belt-like body under a state in which:
an arrangement direction of the core pieces matches a width direction of the elongated belt-like body;
the tooth portions of the core pieces are oriented toward one side in a delivery direction of the elongated belt-like body; and
the posture holding portions are stamped under a state in which the posture holding portions are each located between the tooth portions of the core-piece coupled body on another side in the delivery direction of the elongated belt-like body.

15. The method of manufacturing an armature according to claim 11,
wherein, in the pressing step, the core-piece coupled body is stamped from the elongated belt-like body under a state in which:
an arrangement direction of the core pieces matches a width direction of the elongated belt-like body; and
tooth portions of one core-piece coupled body of core-piece coupled bodies adjacent to each other in a delivery direction of the elongated belt-like body are each located between tooth portions of another core-piece coupled body.

16. The method of manufacturing an armature according to claim 11,
wherein, in the pressing step, the core-piece coupled body is stamped from the elongated belt-like body under a state in which:
an arrangement direction of the core pieces matches a width direction of the elongated belt-like body; and
tooth portions of one core-piece coupled body of core-piece coupled bodies adjacent to each other in a delivery direction of the elongated belt-like body are each located between core back portions of another core-piece coupled body.

17. The method of manufacturing an armature according to claim 11, prior to the separating step, further comprising:
an insulating member mounting step of bending the first thin portion and the second thin portion of the segment-core coupled body and opening one segment core of adjacent segment cores with respect to another segment core about the posture holding portion, to thereby mount an insulating member to the tooth of the one segment core; and
a coil mounting step of winding a wire around the tooth having the insulating member mounted thereto.

18. The method of manufacturing an armature according to claim 11, prior to the separating step, further comprising:
a step of bending the first thin portion and the second thin portion of the segment-core coupled body and increasing a distance between adjacent segment cores, to thereby produce the segment-core coupled body which is linearly expanded;
an insulating member mounting step of mounting an insulating member to the tooth of the segment core; and
a coil mounting step of winding a wire around the tooth having the insulating member mounted thereto.

19. The method of manufacturing an armature according to claim 11,
wherein the posture holding portion of the segment-core coupled body having been laminated in the laminating step is fixed by a first fixing member, and
wherein, in the separating step, the segment core is separated by cutting the first thin portion and the second thin portion.

20. The method of manufacturing an armature according to claim 19, wherein the first fixing member is a caulking portion or welding.

21. The method of manufacturing an armature according to claim 19, wherein the segment core of the segment-core coupled body having been laminated in the laminating step is fixed by a second fixing member.

22. The method of manufacturing an armature according to claim 21, wherein the second fixing member is a bonding portion.

23. The method of manufacturing an armature according to claim 11, prior to the separating step, further comprising:
a step of bending the first thin portion and the second thin portion of the segment-core coupled body and increasing a distance between adjacent segment cores, to thereby produce the segment-core coupled body which is linearly expanded;
an insulating member mounting step of covering both side surfaces and both end surfaces of the tooth of the segment core with molded resin; and
a coil mounting step of winding a wire around the tooth covered with the molded resin.

24. The method of manufacturing an armature according to claim 11, further comprising:
a step of annularly arranging the segment cores by bringing side surfaces of the core backs in the circumferential direction in to abutment against one another; and
a step of integrating the segment cores having been annularly arranged by welding the abutment portions of the core backs from a radially outer side.

25. The method of manufacturing an armature according to claim 24,
wherein, in the separating step, the segment core is separated from the segment-core coupled body by cutting the first thin portion and the second thin portion, and
wherein the welding portion of the abutment portion of the adjacent core backs is formed in a circumferential region including a cut surface of the first thin portion and a cut surface of the second thin portion which are opposed to each other across the abutment portion of the adjacent core backs.

26. The method of manufacturing an armature according to claim 24,
- wherein, in the separating step, the segment core is separated from the segment-core coupled body by cutting the first thin portion and the second thin portion, and
- wherein the welding portion of the abutment portion of the adjacent core backs is formed, in a circumferential region including a cut surface of the first thin portion and a cut surface of the second thin portion which are opposed to each other across the abutment portion of the adjacent core backs, in a region on the second thin portion side with respect to the cut surface of the first thin portion and on the first thin portion side with respect to the second thin portion.

* * * * *